US011062180B2

(12) United States Patent
Guo et al.

(10) Patent No.: US 11,062,180 B2
(45) Date of Patent: Jul. 13, 2021

(54) COMPLEXITY-BASED PROGRESSIVE TRAINING FOR MACHINE VISION MODELS

(71) Applicant: Shenzhen Malong Technologies Co., Ltd., Shenzhen (CN)

(72) Inventors: Sheng Guo, Shenzhen (CN); Weilin Huang, Shenzhen (CN); Haozhi Zhang, Shenzhen (CN); Chenfan Zhuang, Shenzhen (CN); Dengke Dong, Shenzhen (CN); Matthew R. Scott, Shenzhen (CN); Dinglong Huang, Shenzhen (CN)

(73) Assignee: Shenzhen Malong Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/079,472

(22) PCT Filed: Jul. 18, 2018

(86) PCT No.: PCT/CN2018/096171
§ 371 (c)(1),
(2) Date: Aug. 23, 2018

(87) PCT Pub. No.: WO2020/014903
PCT Pub. Date: Jan. 23, 2020

(65) Prior Publication Data
US 2021/0125001 A1    Apr. 29, 2021

(51) Int. Cl.
*G06K 9/00*    (2006.01)
*G06K 9/62*    (2006.01)

(52) U.S. Cl.
CPC ......... *G06K 9/6259* (2013.01); *G06K 9/6221* (2013.01); *G06K 9/6264* (2013.01); *G06K 9/6269* (2013.01)

(58) Field of Classification Search
CPC ...... G06K 9/6259; G06K 9/6264; G06K 9/66; G06K 9/6254; G06K 9/6255;
(Continued)

(56) References Cited

U.S. PATENT DOCUMENTS 8,542,905 B2 * 9/2013 Wang ................. G06K 9/6265
382/141
8,873,798 B2 * 10/2014 Tsagkatakis ............. G06K 9/66
382/103
(Continued)

FOREIGN PATENT DOCUMENTS

CN    106886573 A    6/2017
CN    107451189 A    12/2017

OTHER PUBLICATIONS

Deng et al. , "Model compression and hardware acceleration for Neural Networks", IEEE 2020.*
(Continued)

*Primary Examiner* — Amir Alavi
(74) *Attorney, Agent, or Firm* — Shook, Hardy & Bacon L.L.P.

(57) ABSTRACT

Methods and systems for training machine vision models (MVMs) with "noisy" training datasets are described. A noisy set of images is received, where labels for some of the images are "noisy" and/or incorrect. A progressively-sequenced learning curriculum is designed for the noisy dataset, where the images that are easiest to learn machine-vision knowledge from are sequenced near the beginning of the curriculum and images that are harder to learn machine-vision knowledge from are sequenced later in the curriculum. An MVM is trained via providing the sequenced curriculum to a supervised learning method, so that the MVM learns from the easiest examples first and the harder training examples later, i.e., the MVM progressively accumulates knowledge from simplest to most complex. To
(Continued)

sequence the curriculum, the training images are embedded in a feature space and the "complexity" of each image is determined via density distributions and clusters in the feature space.

20 Claims, 13 Drawing Sheets

(58) Field of Classification Search
CPC .... G06K 9/4628; G06K 9/2013; G06K 9/344; G06K 9/6272; G06K 9/6281; G06K 9/6216; G06K 9/00986; G06K 9/00228; H04N 7/0145; G06N 3/063; G06N 3/04; G06F 17/30249
See application file for complete search history.

(56) References Cited

U.S. PATENT DOCUMENTS

| | | | |
|---|---|---|---|
| 8,909,563 B1 | 12/2014 | Jing et al. | |
| 10,055,673 B2* | 8/2018 | Burgos | G06T 7/77 |
| 10,417,533 B2* | 9/2019 | Barker | G06K 9/4604 |
| 10,607,116 B1* | 3/2020 | Omer | G07G 1/0063 |
| 10,655,978 B2* | 5/2020 | Marti | G06K 9/00832 |
| 10,740,694 B2* | 8/2020 | Harvill | G06N 5/04 |
| 10,846,523 B2* | 11/2020 | Such | G06K 9/3283 |
| 10,860,836 B1* | 12/2020 | Tyagi | G06K 9/4628 |
| 2012/0321174 A1 | 12/2012 | Tsymbal et al. | |
| 2013/0336580 A1 | 12/2013 | Saund | |
| 2018/0136332 A1* | 5/2018 | Barfield, Jr. | G06T 7/70 |

OTHER PUBLICATIONS

International Search Report and Written Opinion dated Apr. 17, 2019 in International Patent Application No. PCT/CN2018/096171, 9 pages.
Bengio, Yoshua, Jérôme Louradour, Ronan Collobert, and Jason Weston. "Curriculum learning." In Proceedings of the 26th annual international conference on machine learning, pp. 41-48. ACM, 2009.
Bossard, Lukas, Matthieu Guillaumin, and Luc Van Gool. "Food-101—mining discriminative components with random forests." In European Conference on Computer Vision, pp. 446-461. Springer, Cham, 2014.
Brodley, Carla E., and Mark A. Friedl. "Identifying mislabeled training data." Journal of artificial intelligence research 11 (1999): 131-167.
Chen, Liang-Chieh, George Papandreou, Iasonas Kokkinos, Kevin Murphy, and Alan L. Yuille. "Deeplab: Semantic image segmentation with deep convolutional nets, atrous convolution, and fully connected crfs." IEEE transactions on pattern analysis and machine intelligence 40, No. 4 (2017): 834-848.
Chen, Xinlei, Abhinav Shrivastava, and Abhinav Gupta. "NEIL: Extracting visual knowledge from web data." In Proceedings of the IEEE International Conference on Computer Vision, pp. 1409-1416. 2013.
Deng, Jia, Wei Dong, Richard Socher, Li-Jia Li, Kai Li, and Li Fei-Fei. "Imagenet: A large-scale hierarchical image database." In 2009 IEEE conference on computer vision and pattern recognition, pp. 248-255. IEEE, 2009.
Everingham, Mark, Luc Van Gool, Christopher KI Williams, John Winn, and Andrew Zisserman. "The PASCAL visual object classes challenge 2007 (VOC2007) results." (2007).
Fergus, Rob, Yair Weiss, and Antonio Torralba. "Semi-supervised learning in gigantic image collections." In Advances in neural information processing systems, pp. 522-530. 2009.
Frénay, Benoît, and Michel Verleysen. "Classification in the presence of label noise: a survey." IEEE transactions on neural networks and learning systems 25, No. 5 (2013): 845-869.
He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.
He, Kaiming Georgia Gkioxari, Piotr Dollar, and Ross Girshick. "Mask R-CNN." In Proceedings of the IEEE international conference on computer vision, pp. 2961-2969. 2017.
Hong, Seunghoon, Hyeonwoo Noh, and Bohyung Han. "Decoupled deep neural network for semi-supervised semantic segmentation." In Advances in neural information processing systems, pp. 1495-1503. 2015.
Ioffe, Sergey, and Christian Szegedy. "Batch normalization: Accelerating deep network training by reducing internal covariate shift." arXiv preprint arXiv:1502.03167 (2015).
Jiang, Lu, Zhengyuan Zhou, Thomas Leung, Li-Jia Li, and Li Fei-Fei. "Mentornet: Learning data-driven curriculum for very deep neural networks on corrupted labels." arXiv preprint arXiv:1712.05055 (2017).
Larsen, Jan, L. Nonboe, Mads Hintz-Madsen, and Lars Kai Hansen. "Design of robust neural network classifiers." In Proceedings of the 1998 IEEE International Conference on Acoustics, Speech and Signal Processing, ICASSP'98 (Cat. No. 98CH36181), vol. 2, pp. 1205-1208. IEEE, 1998.
Lee, Kuang-Huei, Xiaodong He, Lei Zhang, and Linjun Yang. "Cleannet: Transfer learning for scalable image classifier training with label noise." In Proceedings of the IEEE Conference on Computer Vision and Pattern Recognition, pp. 5447-5456. 2018.
Li Wen, Limin Wang, Wei Li, Eirikur Agustsson, Jesse Berent, Abhinav Gupta, Rahul Sukthankar, and Luc Van Gool. "WebVision challenge: visual learning and understanding with web data." arXiv preprint arXiv:1705.05640 (2017).
Li, Wen, Limin Wang, Wei Li, Eirikur Agustsson, and Luc Van Gool. "Webvision database: Visual learning and understanding from web data." arXiv preprint arXiv:1708.02862 (2017).
Lin, Tsung-Yi, Priya Goyal, Ross Girshick, Kaiming He, and Piotr Dollár. "Focal loss for dense object detection." In Proceedings of the IEEE international conference on computer vision, pp. 2980-2988. 2017.
Lin, Tsung-Yi, Michael Maire, Serge Belongie, James Hays, Pietro Perona, Deva Ramanan, Piotr Dollár, and C. Lawrence Zitnick. "Microsoft COCO: Common objects in context." In European conference on computer vision, pp. 740-755. Springer, Cham, 2014.
Liu, Wei, Dragomir Anguelov, Dumitru Erhan, Christian Szegedy, Scott Reed, Cheng-Yang Fu, and Alexander C. Berg. "SSD: Single shot multibox detector." In European conference on computer vision, pp. 21-37. Springer, Cham, 2016.
Long, Jonathan, Evan Shelhamer, and Trevor Darrell. "Fully convolutional networks for semantic segmentation." In Proceedings of the IEEE conference on computer vision and pattern recognition, pp. 3431-3440. 2015.
Misra, Ishan, C. Lawrence Zitnick, Margaret Mitchell, and Ross Girshick. "Seeing through the human reporting bias: Visual classifiers from noisy human-centric labels." In Proceedings of the IEEE Conference on Computer Vision and Pattern Recognition, pp. 2930-2939. 2016.
Pandey, Paritosh, Akella Deepthi, Bappaditya Mandal, and Niladri B. Puhan. "FoodNet: Recognizing foods using ensemble of deep networks." IEEE Signal Processing Letters 24, No. 12 (2017): 1758-1762.
Patrini, Giorgio, Alessandro Rozza, Aditya Krishna Menon, Richard Nock, and Lizhen Qu. "Making deep neural networks robust to label noise: A loss correction approach." In Proceedings of the IEEE Conference on Computer Vision and Pattern Recognition, pp. 1944-1952. 2017.
Redmon, Joseph, Santosh Diwala, Ross Girshick, and Ali Farhadi. "You only look once: Unified, real-time object detection." In Proceedings of the IEEE conference on computer vision and pattern recognition, pp. 779-788. 2016.
Ren, Shaoqing, Kaiming He, Ross Girshick, and Jian Sun. "Faster R-CNN: Towards real-time object detection with region proposal networks." In Advances in neural information processing systems, pp. 91-99. 2015.

(56) References Cited

OTHER PUBLICATIONS

Rodriguez, Alex, and Alessandro Laio. "Clustering by fast search and find of density peaks." Science 344, No. 6191 (2014): 1492-1496.

Rolnick, David, Andreas Veit, Serge Belongie, and Nir Shavit. "Deep learning is robust to massive label noise." arXiv preprint arXiv:1705.10694 (2017).

Simonyan, Karen, and Andrew Zisserman. "Very deep convolutional networks for large-scale image recognition." arXiv preprint arXiv:1409.1556 (2014).

Sukhbaatar, Sainbayar, Joan Bruna, Manohar Paluri, Lubomir Bourdev, and Rob Fergus. "Training convolutional networks with noisy labels." arXiv preprint arXiv:1406.2080 (2014).

Szegedy, Christian, Sergey Ioffe, Vincent Vanhoucke, and Alexander A. Alemi. "Inception-v4, inception-resnet and the impact of residual connections on learning." In Thirty-First AAAI Conference on Artificial Intelligence. 2017.

Szegedy, Christian, Vincent Vanhoucke, Sergey Ioffe, Jon Shlens, and Zbigniew Wojna. "Rethinking the inception architecture for computer vision." In Proceedings of the IEEE conference on computer vision and pattern recognition, pp. 2818-2826. 2016.

Veit, Andreas, Neil Alldrin, Gal Chechik, Ivan Krasin, Abhinav Gupta, and Serge Belongie. "Learning from noisy large-scale datasets with minimal supervision." In Proceedings of the IEEE Conference on Computer Vision and Pattern Recognition, pp. 839-847. 2017.

Xiao, Tong, Tian Xia, Yi Yang, Chang Huang, and Xiaogang Wang. "Learning from massive noisy labeled data for image classification." In Proceedings of the IEEE conference on computer vision and pattern recognition, pp. 2691-2699. 2015.

Zhou, Zhi-Hua. "A brief introduction to weakly supervised learning." National Science Review 5, No. 1 (2017): 44-53.

Zhu, Xiaojin Jerry. Semi-supervised learning literature survey. University of Wisconsin-Madison Department of Computer Sciences, 2005.

Szegedy, Christian, Wei Liu, Yangqing Jia, Pierre Sermanet, Scott Reed, Dragomir Anguelov, Dumitru Erhan, Vincent Vanhoucke, and Andrew Rabinovich. "Going deeper with convolutions." In Proceesings of the IEEE conference on computer vision and pattern recognition, pp. 1-9, 2015.

* cited by examiner

COMPLEXITY-BASED PROGRESSIVE TRAINING FOR MACHINE VISION MODELS

CROSS-REFERENCE TO RELATED APPLICATIONS

This application is a national stage application from International Patent Application No. PCT/CN2018/096171, filed Jul. 18, 2018, and entitled "Complexity-Based Progressive Training for Machine Vision Models," the entire contents of which are herein incorporated by reference.

BACKGROUND

The conventional employment of machine vision models (MVMs) implemented by neural networks, such as deep convolutional neural networks (CNNs), has enabled the deployment of various machine vision tasks, such as image classification, object detection, and sematic segmentation, to a finite domain of specific applications. By employing numerous convolutional layers, such deep CNN-implemented MVMs determine visual, as well as hidden and latent, features within an image and statistically classify the image (or recognize objects depicted in the image) based on the determined features. To learn to recognize such features, as well as determine the statistical distributions of such features within images depicting similar objects, the networks are trained with large training datasets. To train an MVM, supervised learning methods are often employed. Such supervised methods utilize training datasets that include pre-labeled (i.e., annotated) images. The labels indicate the correct classification (i.e., the "ground-truth") of the image, one or more objects depicted within the image, and/or the location of the depicted objects within the image. Trained networks are validated with additional pre-labeled validation images. More succinctly, CNNs are conventionally trained and validated, in a fully supervised manner, via ground-truth labeled training and validation datasets.

Because training such machine learning methods requires the accumulation of statistically significant and highly-dimensional distributions of (visual, latent, and hidden) features, such training and validation requires significant numbers of labeled images that include significant variations of the depictions and quality of the underlying objects. The performance of a trained and validated CNN is limited by the fidelity of the labels included in the training and validation datasets. That is, the training and validation steps are limited in whether a label for an image accurately reflects the ground-truth of the image, e.g., what objects and/or scenes are visually depicted within the image.

Accordingly, some conventional methods for training CNNs have relied on humans manually providing high-quality, consistent, accurate, and precise labels for the generation of "clean" training/validation datasets. Annotating individual images to provide "clean" labels is expensive and time consuming, especially for specialized tasks that require expert annotators, e.g., annotating radiological images with labels indicating correct classifications of tumors. Also, the quality and consistency of the labels may vary amongst human annotators. Such factors have limited the deployment of conventional methods to a finite domain of specific applications. That is, these conventional methods have proven difficult to scale to larger domains of more generalized applications.

To reduce the manual labor, errors, and inconsistencies inherent in human-based labeling, other conventional methods have queried the web or large image databases to generate training and validation datasets, where search term(s) may serve as the labels for the returned images. However, such conventional search-based methods are prone to generate "noisy" (or "complex") training/validation datasets. For example, providing the keyword "apple" to an image search engine may return a large number of images. Some of the returned images may depict fruit, another portion of the returned images may depict various mobile computing devices, and still another portion of the returned images may depict various trademarks and/or corporate logos. Search-based methods may additionally return some images with little to no apparent relationship to the search terms. That is, image searches may return images that are incorrectly associated with the search terms. More succinctly, image searches may return images depicting objects with "complex" or "noisy" (i.e., inconsistent and/or incorrect) relationships to the search terms. That is, search-based methods may generate "noisy" or "complex" training/validation datasets, where the labels lack quality, consistency, accuracy, and precision. Employing such "noisy" (or "complex") training/validation datasets for CNNs generally leads to poor performance in machine-vision tasks. Thus, scaling such conventional search-based methods to larger domains of more generalized machine vision tasks has also proven difficult.

SUMMARY

The present invention is directed towards designing and employing complexity-based progressive learning curricula for machine vision models (MVMs) to be trained with large noisily-labeled (or equivalently complexly-labeled) training datasets. That is, the embodiments are directed towards weakly-supervised learning (or training) for machine vision tasks. The embodiments include enhanced weakly-supervised learning techniques (e.g., inexact supervision and/or inaccurate supervision methods) that are enabled to train MVMs via inexactly- and/or inaccurately-labelled image datasets (i.e., noisy or complex training data). In one embodiment, a method to train an MVM includes receiving a set of images associated with an image category (e.g., a semantic concept). Each image (in the set of images) is associated with a label based on the image category. At least some of the visual depictions in the images may be disparate, diverse, and/or dissimilar. Thus the relationship between the associated label and at least some of the images may be noisy or complex (i.e., the labels may be inexact and/or inaccurate). As such, due to the disparity, diversity, and/or dissimilarity in the images, the labelling of the set of images may be noisy and/or complex. The embodiments organize the noisily-labeled images into an ordered sequence that is progressively noisy (or complex), i.e., the set of images is structured into an ordered learning curriculum via complexity rankings of the images. The embodiments then employ the curriculum as training images to iteratively train the MVM based on the order of the sequence, via weakly-supervised training methods. Thus, enhanced weakly-supervised learning methods to address issues regarding inexactly and/or inaccurately (i.e., noisy) labels associated with the training images.

More specifically, the above indicated method apportions (or subdivides) the received set of images into a plurality of images subsets. The images in the set of images are included in one of the plurality of image subsets. In some embodiments, each image is included in one and only one of the plurality of image subsets. That is, a one-to-one mapping of each image and the plurality of image subsets is generated.

The image subsets are sequenced based on a complexity (or noise) ranking of each of the image subsets. The complexity ranking of an image subset indicates a degree of visual similarity of the images included in the image subset. The image subsets are progressively sequenced such that image subsets that include visually similar images are ranked nearer the beginning of the sequence. Those image subsets that include images that have disparate, diverse, and/or dissimilar visual depictions are ranked closer to the end of the sequence of image subsets. Thus, a progressive learning curriculum is designed. The MVM is iteratively trained, via weakly-supervised methods, based on the learning curriculum, i.e., the sequence of the image subsets and the label associated with the set of images. In the embodiments, the MVM may be at least one of an image classification model, an object detection mode, or a semantic segmentation model. The MVM may be implemented on a deep convolutional neural network (CNN).

In various embodiments, to apportion the set of images into the image subsets, for each image included in the set of images, the method generates a vector representation in a feature space associated with the image category. Statistical distributions within the feature space are determined based on the vector representation of the images. A plurality of image clusters are determined based on the statistical distributions. The image subsets are generated based on the image clusters.

In at least one embodiment, a distance between each pair of images within the set of images is determined. For example, a distance norm (e.g., a 2-norm distance), determined by the vector representations (within the feature space) of a pair of images is determined. The distance norm indicates the degree of visual similarity between the pair of images. That is, images that include similar visual depictions are closely embedded within the feature space, as compared to visually dissimilar images. Thus, images may be clustered based on the distances between pairs of the images, via unsupervised methods (e.g., k-means clustering methods). The subsets may be generated from the clusters. In one non-limiting example, a one-to-one mapping (or correspondence) may exists between the image clusters and the image subsets. The complexity ranking of the image subsets (or the image clusters) may be determined based on distances between the pairs of images. For example, a local density metric for the images within a cluster may be determined, and the complexity ranking of a cluster may be based on the local density metrics of images within the cluster.

In various embodiments, an image embedding model is trained to extract features within the images included in the set of images. The embedding model may be implemented by a CNN that is separate from the CNN implementing the MVM to be progressively trained. The detected features may be associated with the image category. The feature space may span the detected features. The trained embedding model is employed to embed each image in the feature space. The image subsets and/or image clusters are generated via density distributions of the embedded images.

A supervised trainer (or a training agent) may be employed to utilize supervised (and/or weakly-supervised) methods to train the MVM via the progressive learning curriculum. Because the embodiments are directed towards weakly-supervised training, in some embodiments, the trainer may be a weakly-supervised trainer. For example, the MVM may be trained via the least complex image subset as the training dataset. Upon detection of a convergence in the training of the MVM based on the least complex image subset, the training may continue by employing a more complex image subset of images as a training dataset. In some embodiments, to ensure that knowledge gained in the earlier stages is not lost, combinations of the currently employed image subset and the previously employed image subsets may be employed. For example, when training with the more complex image subset, a combination of the least complex and the more complex image subsets may be employed. It should be understood that multiple image sets of images, associated with separate image categories, may be combined to generate multiple-classification MVMs, trained via progressive learning curriculum, without loss of generality.

DETAILED DESCRIPTION

Figure 1:
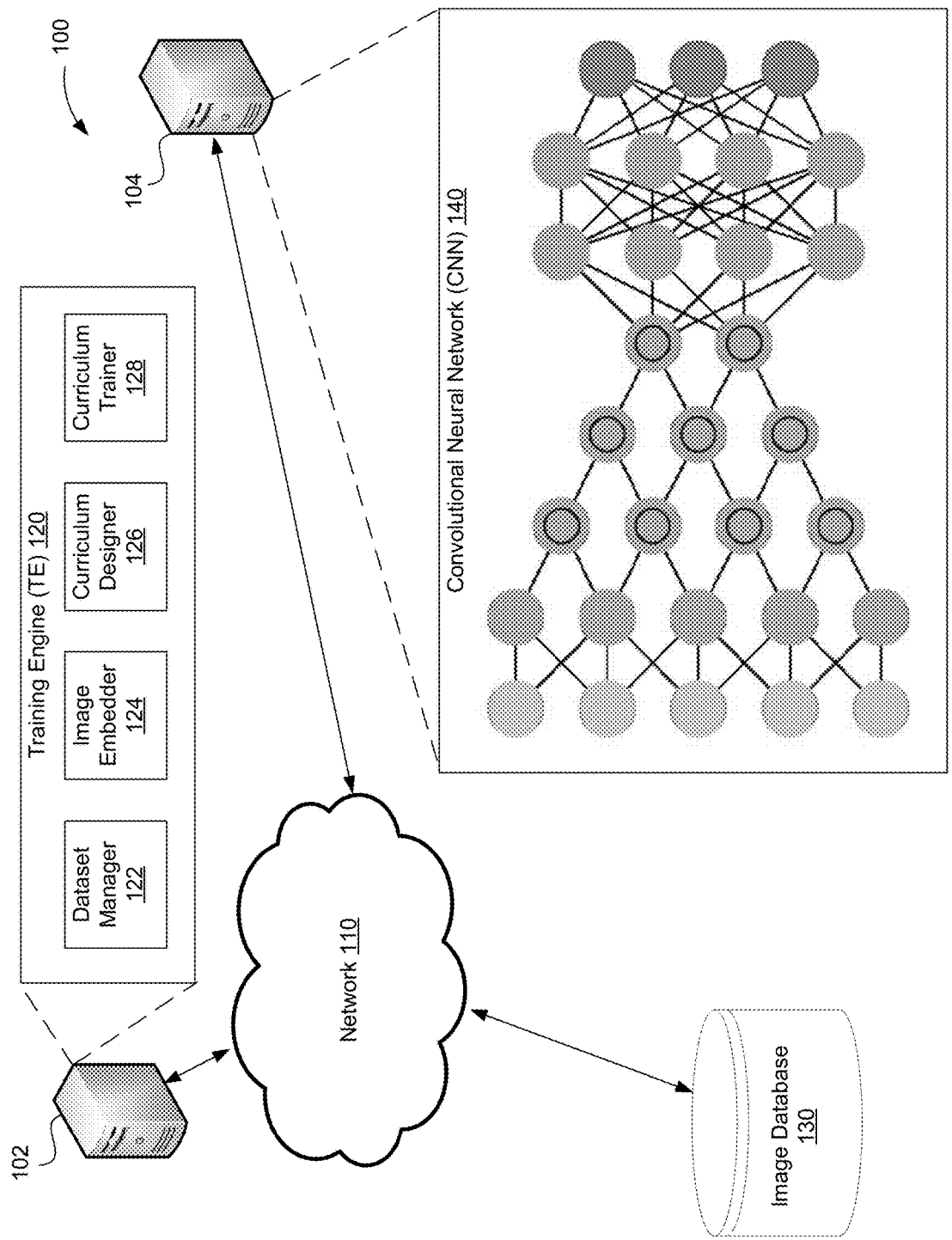
FIG. 1 illustrates an enhanced training system implementing various embodiments presented herein.

As discussed herein, the term "image database" may refer to any public or private collection (or repository) of images. An image database may be organized via image categories (e.g., semantic concepts). Some databases may include thousands of image categories, e.g., "carton," "dog," "taxi," "banana," and the like. As discussed herein, an image may be encoded via image data and visually depict physical objects and/or scenes. Within an image database, each image category may include thousands (or tens of thousands) of images. The various embodiments herein may employ a set of images that is accessed via a category-based image database. That is, an image dataset may be generated by searching an image database via one or more category-specific search queries. Each image in a dataset may be labeled based on the semantic concept corresponding to the image category that the database associates with the image. An image may be employed as a training image and the label associated with the image may serve as an indicator for a ground-truth of the image for purposes of supervised learning and/or training methods.

As discussed herein, terms such as, but not limited to, "complex," "noisy," and "clean" are employed to characterize the employed sets (or subsets) of labeled images. Such terms may refer to the relationship between what is visually depicted in the images and a semantic concept indicated via the label(s) associated with the images. As a non-limiting example, a set of images may be retrieved from an image database, where each retrieved image is associated with (and labeled with) the image category "taxi." Some images in the set may include "clean" depictions of an automobile that would be typically recognized as a taxicab. However, for other images in the set, the relationship between the semantic concept indicated by "taxi" and the image's visual depictions may be more "complex" or "noisy," i.e., less straightforward, more inconsistent or mixed, or even inaccurate. For instance, some of the images in the set may depict advertisements for taxi services, storefronts for taxicab companies, two or three-wheeled pedal-powered vehicles employed to transport people, rickshaws, ride-sharing mobile applications, and the like. Because of the more complex relationship (as compared to the "cleanly-labeled" images) between the label "taxi" and the visual depictions in the image, these images (as well as datasets that include these images) may be referred to as "noisy" or "complex."

Furthermore, within a database, some images included in an image category may be completely mischaracterized and/or misclassified within the image category. That is, some images may be inaccurately and/or incorrectly classified in image databases. To continue with the "taxi" image category example, images may be included in the "taxi" category that have little to no relationship with the semantic concept of "taxi." As such, a labeled image dataset that includes examples of mislabeled images, or images where the relationship between the semantic concept indicated via an image's associated label and the image's visual depictions is complex, varied (or mixed), or inaccurate are discussed throughout as "noisy" or "complex" datasets. That is, image datasets where the relationship between the label and depictions within the images are simple, straightforward, consistent, accurate, and precise are "clean."

Images within a dataset that include a relatively high level (or degree) of visual similarity, are likely associated with a high-quality label that is employed in a consistent, accurate, and precise manner. As such, terms such as "complex," "noisy," and "clean" are herein employed to refer to and/or indicate a set's (or subset's) relative level of visual similarity of the visual depictions of the images included in the set (or subset).

For example, an image dataset that includes images labeled as "apple," but includes varying images depicting various objects such as fruit, smartphones, corporate logos, and automobiles (i.e., a low degree or level of visual similarity) would be referred to as a "complex," "noisy," or "noisily labeled" dataset. Whereas, an image dataset that includes images labeled as "apple" and the images clearly and straightforwardly depict the fruit commonly referred to as an apple (i.e., a high degree or level of visual similarity) may be referred to as a "clean" or "cleanly labeled" dataset. Similarly, an image dataset that includes images labeled as "apple" and the images clearly depict a particular corporate logo may also be a "clean" dataset. These terms may further indicate level of accuracy and/or precision of the image's associated label, with respect to the visual depictions. The terms "noisy" and "complex" may be used interchangeable throughout. Note that terminology such as "noisy," "complex," and "clean" are relative terms. That these terms are applied to image subsets that are associated with varying levels or degrees of visual similarity depicted in the images included in the image subsets. Thus, without loss of generality, relative characterizations of image datasets, such as but not limited to "more noisy," "less noisy," "noisier," "noisiest," "more complex," "less complex," "most complex," and the like may be used throughout.

Conventional methods are often employed to train a neural network with a "clean" training dataset, i.e., a dataset that includes images with a relatively high degree or level of visual similarity and uniformity, as well as a lack of diversity in the images' visual depictions. Such "clean" datasets may be labeled with high-quality, consistent, accurate, and precisely labeled images. However, conventionally generating such a "clean" training dataset often requires human labor. As such, deploying such conventional methods to larger domains of generalized machine vision tasks is limited by the cost and time required for a human workforce to visually inspect, classify, and manually label the dataset, i.e., such methods are not easily scalable to an increasingly diverse range of applications that require significantly large and diverse training datasets. Furthermore, training a neural network with a dataset that lacks diversity in the training images' visual depictions may result in issues related to overfitting the implemented machine vision model (MVM), as well as introducing low generalization capability into the MVM.

Other conventional methods include training a neural network with a "noisy" training dataset, which may include low-quality, inconsistent, inaccurate, and/or imprecise labeled images. The employment of "noisily-labeled" (or equivalently "complexly-labeled") datasets to train neural networks result in poor performing MVMs. Furthermore, conventional methods of employing noisy training data may require significant computational resources, i.e., the training may require a significant number of training iterations to converge to a poor performing model. That is, the training of the models is slow to converge.

In contrast to the above conventional methods, the various embodiments herein are directed towards weakly-supervised graduated training methods for machine vision tasks, such as but not limited to image classification, object, and semantic segmentation. The graduated training is sequentially ordered via a complexity or noise ranking. The various embodiments receive a "noisy" training dataset for an image category (e.g., search term(s) for an image database), where the semantic concept indicated by the image category (or search term(s)) may serve as a label for the images. However, in contrast to conventional methods that may randomly sample from the noisily-labeled images, the various embodiments herein subdivide and/or apportion (via unsupervised clustering methods) the training dataset into a plurality of subsets of training images, where images included in the same subset are of similar "complexity-level" or "noise-level." The subsets are ranked from least "cleanest-level" to highest "complexity-level" subset. That is, the subsets are assigned a complexity ranking that indicates a degree or level of similarity of the images include in the subsets, where the more similar the images are, the lower complexity ranking. A machine vision model (MVM) implemented by a deep convolutional neural network (CNN) is iteratively trained, wherein the initial training iterations employ the "cleanest" subset of labeled training images. After convergence of the CNN via training with the "cleanest" subset of labeled training images, slightly "noisy" (or "complex") training images from the next ranked subset are introduced into the training process. The graduated process continues, with a plurality of increasingly "noisier" subsets, until convergence of training with the "noisiest" images from the "noisiest" subset of labeled training images. Thus, in training, the MVM accumulates progressive knowledge, sequenced from the easiest knowledge to gain to the hardest knowledge to gain.

Weakly-supervised learning (or training) generally refers to training a machine learning model when the labels associated with the training datasets are incomplete (i.e., portions of the training data are unlabeled), inexact (i.e., portions of the training data have coarse-grained and/or inconsistent labels), and/or inaccurate (i.e., portions of the training are have labels that do not reflect the ground-truth encoded in the data). The various embodiments are directed towards enhanced methods for training various machine vision tasks with "noisily-labeled" (i.e., inexactly- and/or inaccurately-labeled) training data. Thus, the various embodiments herein are directed towards enhanced weakly-supervised learning where the learning is via inexact supervision and/or inaccurate supervision. The enhanced weakly-supervised learning methods include organizing the training data in a graduated and/or progressive sequence on increasingly noise and/or complexity. The weakly-supervised methods includes graduated training of the MVM progressively via sequence of increasingly noisy and/or complex training data.

Such weakly-supervised graduated training (or learning) based on image-label complexity may be referred throughout as weakly-supervised "curriculum training" or "curriculum learning." In the various embodiments, a noisily-labeled training dataset that includes images of varying label-image "complexity" (or "noise-level") are organized into a "curriculum" of increasing complexity. As an example, the training dataset may be subdivided (or apportioned) into a "cleanly-labeled" (or "clean") subset, a "noisily-labeled" (or "noisy") subset, and a "noisiest-labeled" ("noisiest") subset of training images. The three subsets are ranked, via "complexity" or "noise level" and sequenced progressively in increasing "complexity:" "clean," "noisy," and "noisiest."

To train a CNN to perform a machine vision task, such but not limited to image classification, the "clean" subset is presented to the CNN first. The CNN trains with the "clean" subset until the CNN learns to perform the machine-vision task with the "cleanly-labeled" images. After adequate training via the "clean" subset, a combination of the "noisy" subset and the "clean" subset is presented to the CNN (that was trained via the "clean" subset) for training. The additional training via the injection of "noisily-labeled" images increases the performance of the CNN, as compared to training only via the "clean" subset. After adequate training with the combination of the "clean" and "noisy" subsets, the CNN (that was trained via the "cleanly-labeled" and "noisily-labeled" images) is further trained with a combination of the "noisiest," "noisy," and "clean" subsets of training images. The injection of the "noisiest-labeled" images into the training provides further increases in performance to the CNN. Thus, in contrast to conventional methods of supervised training, the embodiments herein train a CNN in multiple stages of increasing "learning complexity," via enhanced methods of weakly-supervised learning. As noted above, conventional training methods may not present the training data to the training method in such a sequenced fashion. That is, conventional training methods may randomly sample from the training data in no particular order.

The example of subdividing (or apportioning) the training data into three subsets of training data, via a complexity measure, is non-limiting. In general, a noisy training dataset of sufficient size may be subdivided into N subsets, where N is any integer greater than 1. Also, the above example of training 1000-category image classification CNN model via a single label for each image is non-limiting. A multiple-label classification with an increasing number of categories (or other machine vision task, such as but not limited to object recognition) model may be similarly trained. In general, an M-category noisy training dataset may be accessed by searching an image database over M image categories, where each image is labeled with the corresponding image category, and M is any positive integer. Each of the M image categories may be subdivided into N subsets and ranked via complexity. Equivalently ranked subsets of images across separate image categories may be combined to generate N ranked subsets of increasing complexity, where each subset includes labeled training images of similar complexity and ranging over M image categories (and M corresponding label values). An M-category classification model may be trained via curriculum learning employing the N ranked subsets of training images.

Various methodologies may be employed to subdivide a noisy training dataset into N subsets of increasing complexity. In one non-limiting embodiment, an embedding model may be initially trained on the entirety of the noisy set of training images for the image classification. The embedding model is trained to embed each image as an image vector into a feature space of the embedding model and associated with the image category. More particularly, the model is trained to map the training images into an abstract feature space via a highly dimensional vector representation. Training the embedding model may result in the feature space of the model representing the underlying structure and relationships of images related to the semantic concept indicated by the image category. Each feature may be represented by one or more dimensions of the feature space. The features may be visual, latent, or hidden features for images in the image category. Such an embedding model may be implemented via a convolutional neural network architecture. In the case of M-category, all images from M categories may be trained jointly, and are projected into a single embedding space. In at least one alternative embodiment, a separate embedding model is trained and deployed for each of the M categories.

Based on the vector embeddings, various unsupervised clustering methods may be employed to cluster the vector representations into N clusters, wherein the clusters indicate varying and/or relative levels of image-label complexity. That is, the images clustered into a first cluster display similar image-label complexity with each other, images clustered into a second cluster display similar image-label complexity with each other, and the image-label complexity of images included in the first cluster differ from the image-label complexity of the images included in the second cluster. In one non-limiting embodiment, an enhanced and unsupervised density-based k-means clustering method is employed to cluster the images into complexity-based clusters.

To generate the complexity-ranked sequence of subsets of training images, clustering is applied to each image category, by using the common embedding space. A distance between each pair of training images within each category (in the feature space), is determined via the vector representations of the images. For each training image in the training set, a local density metric is determined based on the distances between the pairs. A distance metric for each training image is also determined based on the distances between the pairs and the density metrics. The training images are embedded (or represented) in a density-distance (2D) space based on the density and distance metrics. An unsupervised k-means clustering method is employed to determine N image clusters, within the density-distance space, of varying complexity levels via the embeddings within the density-distance space. To generate the complexity-ranked sequence of N subsets of training images, the N clusters in each category are ranked by increasing complexity-levels, and the clusters with a same ranked complexity are combined across all categories to form a final subset.

As indicated throughout, the embodiments design a progressive or graduated learning curriculum, via the complexity-ranked sequence of subsets of training images. The designed curriculum is enabled to discover meaningful and underlying local structure of large-scale noisy images (i.e., nosily-labeled training images). In the design of the curriculum, training images are ranked from easy (or clean) to complex in a learned feature space in an unsupervised manner. Density-based (unsupervised) clustering is employed to generate the complexity rankings of the training images and subsets of training images. The clustering methods determine the image complexity via vector embeddings within a 2D local density-distance feature space. In contrast to conventional methods that attempt to train with noisily-labeled training images in small-scale or moderate-scale datasets, the embodiments herein design a graduated learning curriculum that enables a progressive training with standard CNN architectures. The knowledge acquired during the training is cumulative, and the training starts with the "easiest" examples of training images and progresses towards the "more difficult" examples of training images. The training may be terminated after the CNN is provided the "most difficult" examples of training images, and the training converges to generate a high-performing MVM. As such, the embodiments are applicable and scalable to large-scale datasets that include millions of images with massive noisy labels, i.e., complex or noisy image category associations.

In the various embodiments a supervised (or weakly-supervised) trainer (or training agent) may be employed to train the MVM, via the progressive learning curriculum. The supervised trainer may employ be various enhanced supervised (or weakly-supervised) learning methods, where the label(s) associated with the images in the image subsets is employed. For example, a loss function may be defined that measures differences, error, or losses of the MVMs predictions for a training image and the image's ground-truth, as indicated by the associated label. Training the MVM may include iteratively updating the MVM's weights via various backpropagation methods, such that the loss function for the trained MVM is minimized, or at least decreased. The supervised trainer may automatically update hyper-parameters of the MVM.

Example Operating Environment

FIG. 1 illustrates an enhanced training system implementing various embodiments presented herein. System 100 includes one or more various computing devices, such as but not limited to training engine (TE) computing device 102 and neural network (NN) computing device 104. As shown in FIG. 1, TE computing device 102 hosts and/or implements training engine 120. NN computing device 104 hosts and/or implements one or more deep neural networks (DNN) such as but not limited to convolutional neural network (CNN) 140. Other embodiments of system 100 may include additional, alternative, and/or less computing devices. An exemplary, but non-limiting embodiment of a computing device is discussed in conjunction with at least computing device 900 of FIG. 9. That is, at least structures, functionalities, or features of computing device 900 may be included in any of computing devices 102 or 104.

System 100 may include one or more image databases, such as but not limited to image database 130. Image database 130 may include millions, or even tens of millions, of instances of images, encoded via image data, that may be used to train a machine vision model via supervised (or weakly-supervised) methods. The images within image database 130 may be organized into multiple image categories. An image category may be indicative of one or more semantic concepts. Each image category may include thousands, or even tens of thousands of images that depicts objects or scenes that are related to the image category. As discussed throughout, the relationship between the image category and the image depictions may be complex. Some of the images included in various image categories may be misclassified and/or spurious. That is, at least some of the image categories may include instances of images whose relationship to the image category may be "noisy" or "complex." In some embodiments, image database 130 may include at least 1000 image categories, such as but not limited to "carton," "dog," "taxi," "banana," and the like. Image database 130 may be searchable via the image category. For example, a search engine may query image database 130 with a search query that indicates the "carton" image category. In response, image database 130 may return at least a portion of the images included in the queried image category.

Various embodiments of training engine 120 are discussed in conjunction with at least FIGS. 2A-7B. However, briefly here, training engine (TE) 120 is enabled to train a machine vision model (MVM), implemented via CNN 140. The MVM may be, but is not limited to an image classification model (ICM), an object detection model (ODM), or semantic segmentation model (SSM). TE 120 is an enhanced training engine because TE 120 trains CNN 140 (or equivalently the MVM implemented by CNN 140) via the various embodiments of complexity-based graduated (or progressive) training discussed herein. That is, enhanced TE 120 trains an MVM implemented by CNN 140 by designing a graduated learning curriculum. The graduated learning curriculum is deployed such that the initially provided training images are "cleanly-labelled" instances of training images that are easily classified and/or discriminated. Thus, the initial knowledge gained via the training is the "easiest" knowledge to gain. The curriculum gradually introduces more "noisily-labelled" instances of training images that are more difficult to classify and/or discriminate. The MVM is iteratively trained to build upon the more easily acquired knowledge and learn the more difficult-to-acquire knowledge as the more difficult instances of training images are provided. As such, the curriculum is designed such that the training is cumulative and progressive.

More particularly, TE 120 may receive a set of training images associated with an image category. For example, TE may query image database 130 with an image category. In response, image database 130 returns at least a portion of the images in the queried image category. In order to train CNN 140 via supervised (or weakly-supervised) methods, TE 120 may label each of the images with the image category. Because the image categories may be "noisy" or "complex," the set of training images may include varying degrees of "cleanly-labeled" training images, as well as varying degrees of "noisily-labeled" training images.

TE 120 employs the set of training images labelled with the associated image category to train an embedding model for all images in the while training set. The trained embedding model is utilized to generate a vector representation for each training image in the entirety of the dataset. The vector representation may be in a highly dimensional feature space indicative of the features of the images in the image category. That is, the vector representation may be a deep representation. More specifically, the embedding model for the whole training setembeds each training image in the feature space of the embedding model via an image vector representation. By embedding the training images into the feature space, the embedding model maps the training images into the feature space. The feature space for the data set indicates the underlying structure and relationships of the images, and provides an efficient means to determine the complexity of the training images. The embedding model may be implemented by a deep convolutional neural network that is separate than CNN 140. The feature space may be indicative of deep fully-convolutional features.

Based on these vector embeddings, the complexity of the training images is determined. The training images are subdivided (or apportioned) into a complexity-ranked sequence of subsets of training images. That is, TE 120 designs a learning curriculum based on the "complexity" or "noise" in the received set of training images. The learning curriculum is deployed to iteratively train the MVM implemented by CNN 140. As indicated elsewhere, the learning curriculum begins by training the MVM via the "cleanest" (or "least complex") subset of training images and continues by gradually adding training images from the "noisier" datasets. In this way, the MVM is trained progressively, and accumulates earlier (and easier gained) knowledge learned from the "less noisy" subsets of training images. Once the complexity-based graduated training is completed, trained CNN 140 may be deployed via NN computing device 104.

A general or specific communication network, such as but not limited to communication network 110, may communicatively couple at least a portion of computing devices 102-104 and one or more image databases, including but not limited to image database 130. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

Image database 130 may be implemented by a storage device that may include volatile and non-volatile storage of digital data. A storage device may include non-transitory storage media. Communication network 110 may communicatively couple image database 130, or any other storage device, to at least a portion of computing devices 102-104. In some embodiments, image database 130 may be stored on a storage device distributed over multiple physical storage devices. Thus, image database 130 may be implemented on a virtualized storage device. For instance, one or more "cloud storage" services and/or service providers may provide, implement, and/or enable image database 130. A third party may provide such cloud services. Training data, such as but not limited to data used to train CNN 140, may be temporarily or persistently stored in image database 130.

Generalized Enhanced Training Engine for Complexity-Based Curriculum Learning

One non-limiting embodiment of an enhanced training engine (TE) that is enabled to design and deploy graduated learning curriculums to progressively training a machine vision model (MVM) is illustrated as TE 120 in FIG. 1. TE 120 includes a dataset manager 122, and image embedder 124, a curriculum designer 126, and a curriculum trainer 128. Without deviating from the spirit of the inventive concept, other embodiments may vary in design, architecture, features, functionality, and/or other implementation details.

Dataset manager 122 is generally responsible for receiving a set of training images (i.e., training dataset) and managing the dataset. In some examples, dataset manager 122 may include a search engine enabled to query image database 130 of FIG. 1 and receive the set of training images based on the query. For example, dataset manager 122 may query image database 130 with a particular image category (e.g., "dog") and receive a set of training images associated with the queried image category. As discussed throughout, the received set of training images may be "noisy" or "complex" because the relationship between the depictions in a portion of the images and the semantic concept indicated by "dog" may be complex. Some of images may have little to no relationship to the category of "dog." That is, some of the images may be misclassified as belonging in the image category of "dog." Dataset manager 122 may label each of the received images with a label corresponding to the associated image category.

Image embedder 124 is generally responsible for training an embedding model to embed each of the received images in a feature space computed from the whole training set with multiple categories. Curriculum designer 126 is generally responsible for designing a complexity-based graduated, or progressive, learning curriculum based on the vector embeddings. That is, curriculum designer 126 subdivides the noisy set of training images into a complexity-based ranked sequence of subsets of training images. The ranking of the subsets may be progressive, in that the subsets are ranked from least complex to most complex.

Figure 2A:
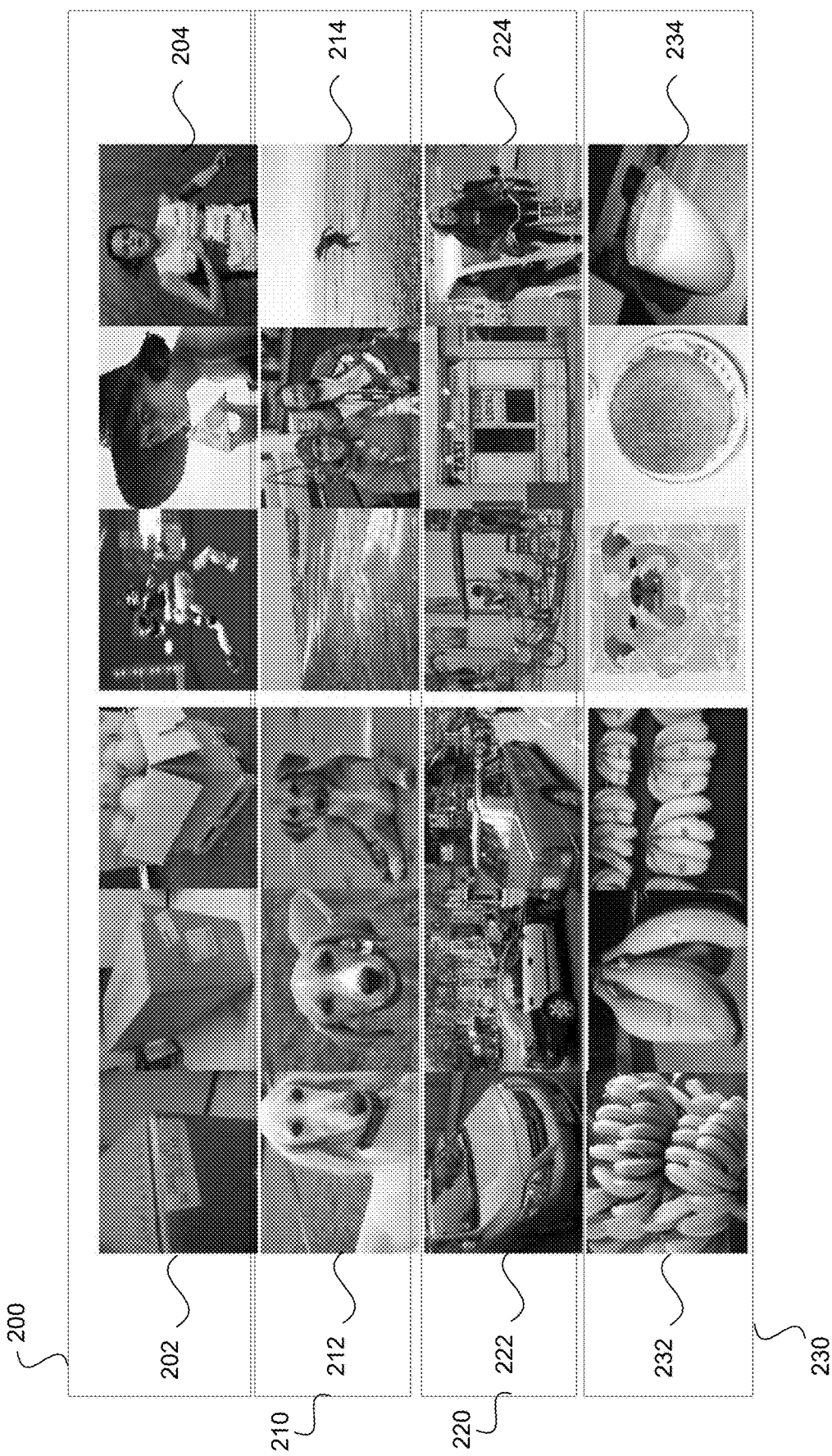
FIG. 2A illustrates non-limiting examples of noisy sets of training images that are subdivided into complexity-ranked sequences of subsets of training images by methods that are consistent with the various embodiments described herein.

Curriculum trainer 128 is generally responsible for iteratively training a MVM implemented by a CNN via the progressive learning curriculum. Curriculum trainer 128 may include (or employ) a supervised (or weakly-supervised) trainer (or training agent) to train the MVM, via the progressive learning curriculum. That is, curriculum trainer 128 (or the supervised trainer) may employ various supervised (or weakly-supervised) learning methods, where the label(s) associated with the images in the image subsets is employed. For example, a loss function may be defined that measures differences, error, or losses of the MVMs predictions for a training image and the image's ground-truth, as indicated by the associated label. The curriculum trainer 128 may iteratively updated the MVM's weights via various backpropagation methods, such that the loss function for the trained MVM is minimized, or at least decreased FIG. 2A illustrates non-limiting examples of noisy sets of training images that are subdivided into complexity-ranked sequences of subsets of training images by methods that are consistent with the various embodiments described herein. FIG. 2A shows four sets of training images, received from image database 130. Each of the four images sets is associated with a separate queried image category. Set 200 is associated with the image category "carton," set 210 is associated with the image category "dog," set 220 is associated with the image category "taxi," and set 230 is associated with the image category "banana." Each of the images has been labeled with the associated image category.

In this non-limiting example, each of the subsets has been subdivided (or apportioned) into two complex-ranked sequences of subsets of training images. It is understood that in the embodiments, the sets may be subdivided into N subsets, where N is any integer greater than 1. The subsets in the left column of FIG. 2A are the "clean" subsets and the subsets in the right column are the "noisy" or "complex" subsets. That is, subset 202 is a clean subset of set 200 and subset 204 is "noisy" subset of set 200. Subset 212 is a clean subset of set 210 and subset 214 is "noisy" subset of set 210. Subset 222 is a clean subset of set 220 and subset 224 is "noisy" subset of set 220. Subset 232 is a clean subset of set 230 and subset 234 is "noisy" subset of set 230. Note that the noisy or complex subsets include images that depict objects or scenes whose relationships may be noisy or complex compared to the semantic concept indicated by the corresponding image category. Furthermore, some of the images in the noisy or complex subsets may be misclassified in the image category.

Figure 2B:
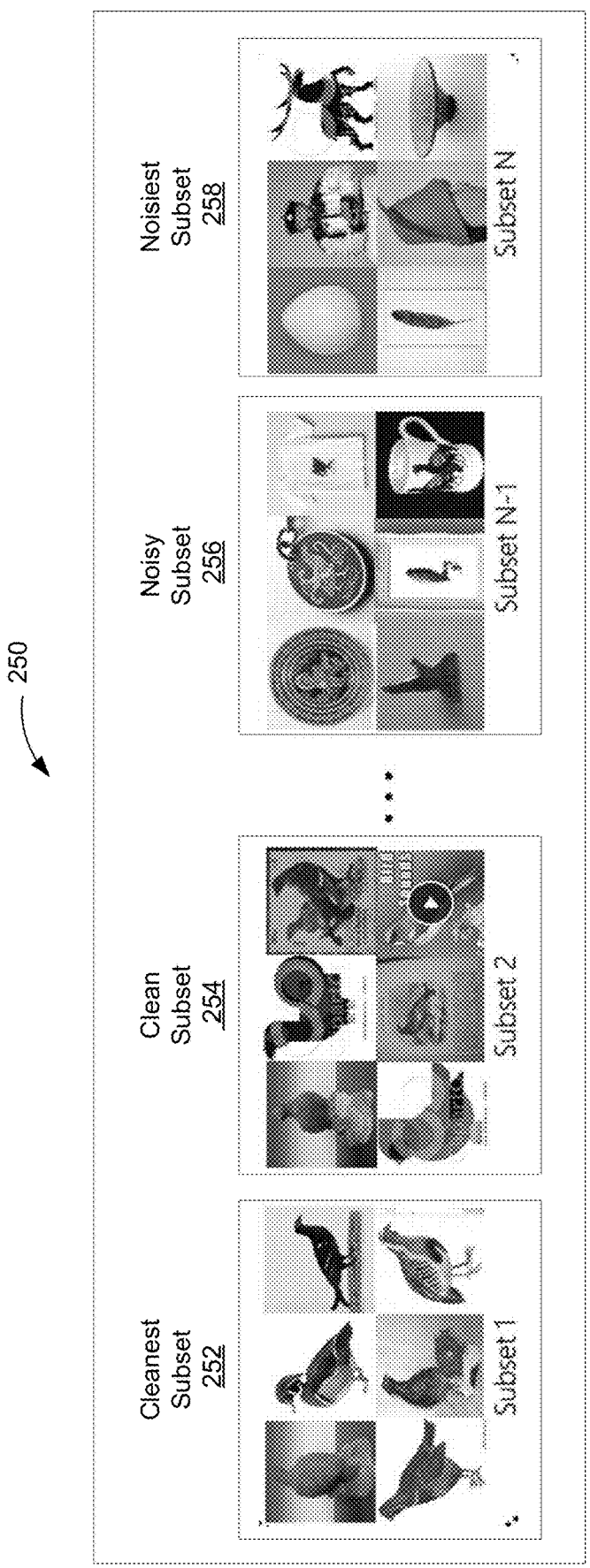
FIG. 2B illustrates another non-limiting example of a set of training images that is subdivided into complexity-ranked sequences of subsets of training images by methods that are consistent with the various embodiments described herein.

FIG. 2B illustrates another non-limiting example of a set of training images that is subdivided into complexity-ranked sequences of subsets of training images by methods that are consistent with the various embodiments described herein. FIG. 2B shows a set of training images associated with the image category "bird." Set 250 has been subdivided (or apportioned) into a complexity-ranked sequence of N subsets of training images, where N is any integer greater than 1. Four of the N subsets are graphically shown as subsets 252, 254, 256, and 258, which are correspondingly ranked via complexity as: cleanest subset 252, clean subset 254, noisy subset 256, and noisiest subset 258. Note that the "less than clean" subsets (subsets 254, 256, 258) include images that depict objects or scenes whose relationships are increasingly noisy or complex compared to the semantic concept indicated by the associated image category of "bird." Furthermore, some of the images in the higher ranked subsets (subsets 256 and 258) may be misclassified in the image category "bird."

Figure 3:
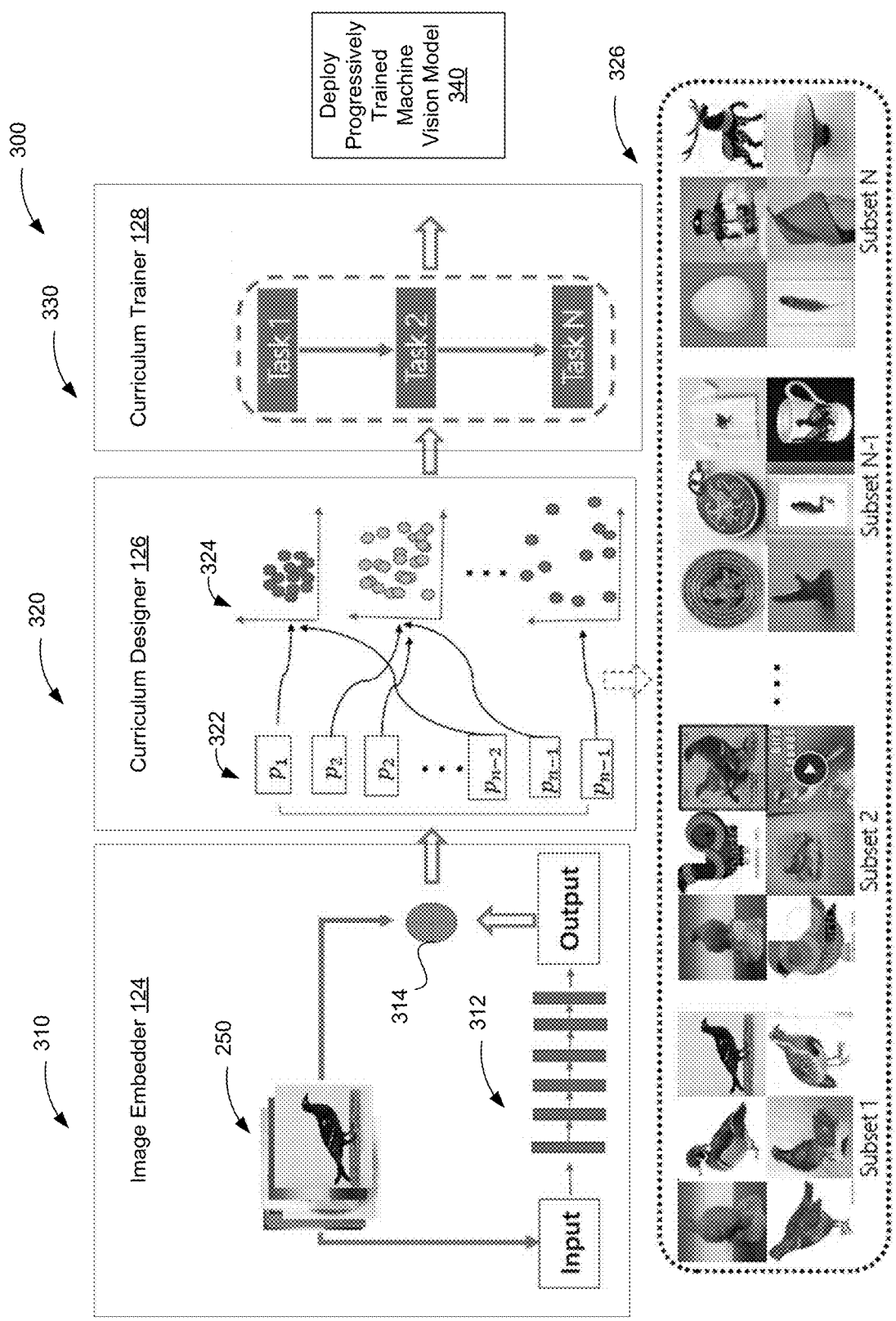
FIG. 3 schematically illustrates an enhanced pipeline for progressive curriculum-based training of a machine vision model that is consistent with the various embodiments.

FIG. 3 schematically illustrates an enhanced pipeline 300 for progressive curriculum-based training of a machine vision model (MVM) that is consistent with the various embodiments. The processes included in enhanced pipeline 300 may be enabled and/or performed by a training engine, such as but not limited to enhanced TE 120 of FIG. 1. In some embodiments, process 310 may be implemented via image embedder 124, process 320 may be implemented by curriculum designer 126, and process 330 may be implemented by curriculum trainer 128.

Process 310 may train an embedding model via an input set of training images, such as but not limited to set of training images 250 of FIG. 2B. The embedding model may be implemented on a deep convolutional neural network (CNN), such as but not limited to CNN 312. The trained embedded model is employed to output the images in a vector representation that embed each image in a feature space that corresponds to the image category associated with the set of training images. Thus, the output process 310 includes vector embeddings 314 of each of the images in a feature space. The feature space of the image category may be highly dimensional, i.e., >>2 dimensions. Note that the input set of training images includes n images, where n is a positive integer.

The output vector embeddings 314 are provided to process 320. Details of process 320 are more fully described in conjunction with at least FIGS. 4A and 6. However, briefly here, based on the vector embeddings in the highly-dimensional (i.e., >>2 dimensions) feature space of the training set, the images are re-embedded in a 2D space. The dimensions in the 2D space are indicative of distance and local density metrics determined from the vector embeddings in the highly dimensional feature space. Unsupervised clustering methods are employed to determine N clusters of images, where each cluster is associated with a separate level of image complexity, where N is an integer greater than 1. Note that typically n>>N. The left-hand column 322 in process 320 indicates a listing of the n images and the right-hand column 324 in process 320 graphically illustrates embedding the n images in the 2D space and generating N clusters of images, based on a complexity measure of the image. Insert 326 shows the subdivision of the input images 250 into a complexity-ranked sequence of subsets of training images. That is, process 320 generates the subdividing of dataset 250 into the N clusters based on the clustering process. More succinctly, process 320 designs the graduated or progressive learning curriculum to be employed in training a machine vision model (MVM) implemented by CNN 140 of FIG. 1, where CNN 140 may be a separate CNN from CNN 312 of FIG. 3.

Process 330 includes the curriculum trainer employing the designed learning curriculum to iteratively train the MVM. Various embodiments of iteratively training a CNN (or equivalently an MVM implemented via the CNN) via a progressive learning curriculum are discussed in conjunction with at least FIGS. 4B and 7A. Process 340 includes deploying the progressively trained MVM.

Figure 4A:
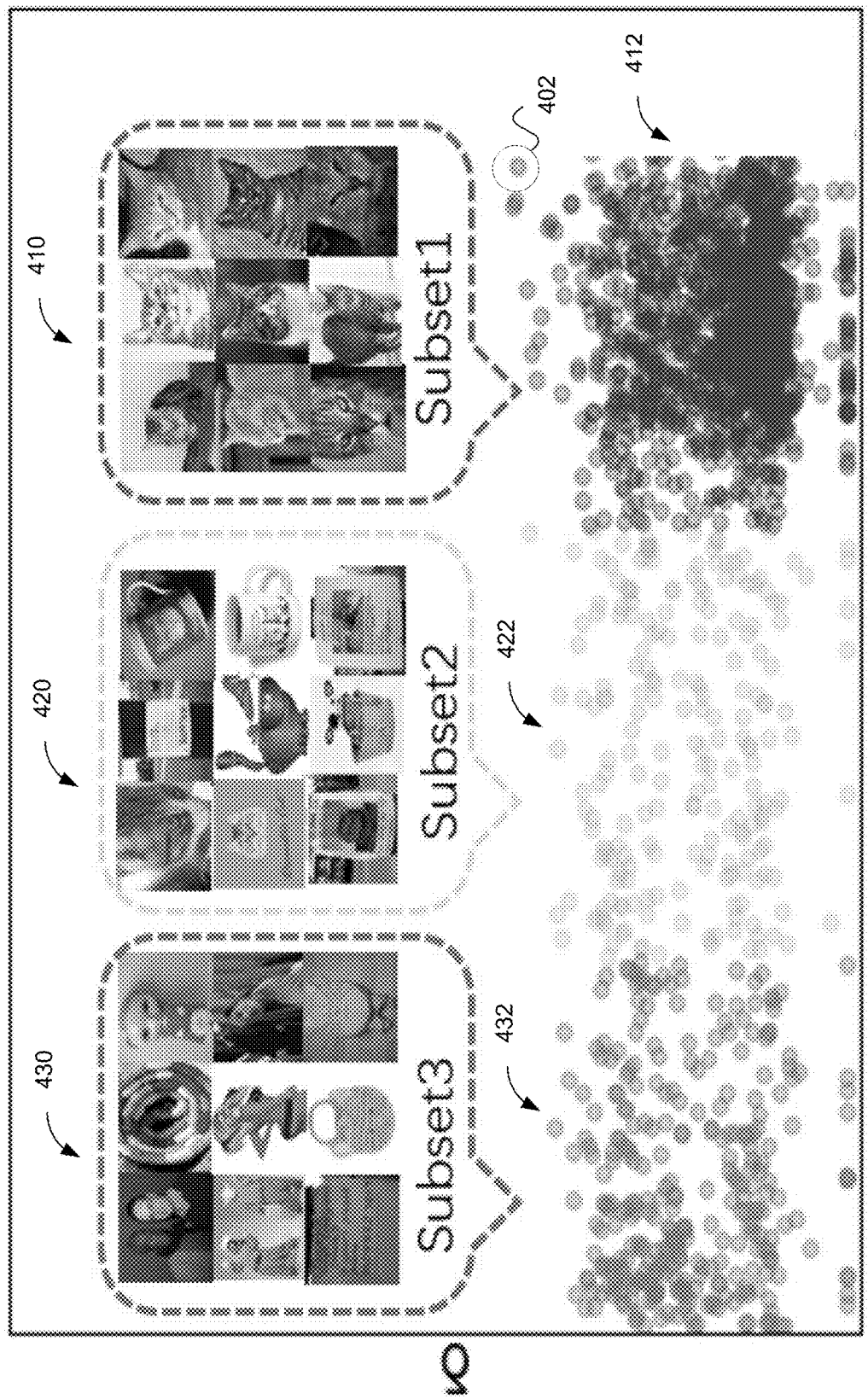
FIG. 4A schematically illustrates an unsupervised clustering process that is employed to design a learning curriculum that is consistent with the embodiments herein.

FIG. 4A schematically illustrates an unsupervised clustering process that is employed to design a learning curriculum that is consistent with the embodiments herein. That is, FIG. 4A illustrates additional details of process 320 of FIG. 3. As indicated above, process 320 may receive vector representations of the set of training images in a highly dimensional feature space of the dataset's associated image category. That is, the training images are represented as image vectors within the feature space. Process 320 may determine a distance norm between each pair of training images in the feature space based on the image vectors. If the images are noted as $P_i$, where i serves as an image index, the vector representations are generated via a convolutional transformation function ($f$) implemented by CNN 312 of FIG. 3, as notated as $P_i \rightarrow f(P_i)$. The distance norms may be included as elements in a distance matrix: $D \subseteq \mathbb{R}^{n \times n}$, where the individual matrix elements are notated as: $D_{i,j}$ where i and j serve as the indices for the pair of images that the distance norm is associated with. Note that D is a symmetric matrix with 0s (zeros) on the diagonal. In one non-limiting embodiment, the distance norm is the 2-norm distance, such that $D_{i,j} = \|f(P_i) - f(P_j)\|^2$. In other embodiments, other distance norms are employed. Due to the training of the embedding model, $D_{i,j}$ indicates a similarity between the $i^{th}$ and $j^{th}$ images, where the smaller the distance between the images, the more similar the images are, in that they include similar features. For example, the embedding model embeds similar images to similar regions within the feature space.

For each training image, a local density metric ($\rho_i$) is determined based on the distance norms between each pair of training images. In one non-limiting embodiment, the local distance metric is determined as follows:

$$\rho_i = \sum_j X(D_{i,j} - d_c), \text{ where}$$

$$X(d) = \begin{cases} 1, d < 0 \\ 0, d \geq 0. \end{cases}$$

In various embodiments, $d_c$ is determined by sorting the $n^2$ distance norm in the distance matrix D, from small values to large values. The distance norm ($D_{i,j}$) ranked at the $k^{th}$ percentile is selected as $d_c$. Is some embodiments, k is chosen to be somewhere between 50% and 70%. In at least one embodiment, k is chosen as 60%. In various embodiments, the performance of the trained MVM is relatively insensitive to the exact value choses for k. For the $i^{th}$ image, the density metric indicates a number of images that are within a threshold distance of $d_c$ from the vector embedding of the $i^{th}$ training image in the feature space. Accordingly, for the $i^{th}$ training image, the local density metric measures a local density of closely projected training images within the feature space. A closely projected subset of training images include similar features, and these subsets likely include visual depictions that are similar. Thus, at least portions of the training images with relatively large local density metrics may be relatively cleanly labeled. By contrast, noisy images may have a significant visual diversity, resulting in a sparse distribution, indicated via a relatively small value of the local density metric.

A distance metric is determined for each training image. Note that the distance metric for the $i^{th}$ image ($\delta_i$) is a separate distance measure than the distance norm ($D_{i,j}$) between the $i^{th}$ and $j^{th}$ images in the feature space. In one embodiment, the distance metric is determined as follows:

$$\delta_i = \begin{cases} \min_{j:\rho_j > \rho_i} (D_{i,j}), \text{ if } \exists \ j \text{ s.t. } \rho_j > \rho_i \\ \max(D_{i,j}), \text{ otherwise} \end{cases}$$

In relation to the $i^{th}$ image, if a $j^{th}$ image has a local density metric that is greater than the $i^{th}$ image's local density metric, i.e., if there exists a $j^{th}$ image that satisfies the relationship ($\rho_j > \rho_i$), then $\delta_i = D_{i,\hat{j}}$, where $\hat{j}$ is the training image that is the closest to the $i^{th}$ image in the feature space. Otherwise, if the $i^{th}$ image has the largest local density metric, then the density metric for the $i^{th}$ image is set to the distance norm between the $i^{th}$ image and the image that is furthest from the $i^{th}$ image in the feature space. Thus, the above expression finds the image, within the image category, with the largest local density metric and assigns it the largest distance metric. This image is selected for the cluster center for the image category.

The training images are projected onto (or re-embedded within) a 2D space, where the dimensions include the local density metric and the distance metric. FIG. 4A illustrates training images associated with the image category "cat" projected onto the 2D local density/distance space. The y-axis corresponds to the distance dimension and the x-axis corresponds to the local density dimension. The selected cluster center for the image category "cat" is indicated as data point 402. The training image corresponding to the cluster center is considered the "cleanest-labeled." That is, the image corresponding to cluster center has the highest confidence that the image category is correctly assigned. The closer another image is to cluster center 402, the higher confidence that the corresponding image also has a correct label. Therefore, clusters of increasing complexity or noise-level are identified based on increasing distance from the cluster center 402 in the 2D density-distance space shown in FIG. 4A. As shown in the non-limiting embodiment of FIG. 4A, N=3, and the set of training images is subdivided (or apportioned) into 3 subsets according to a distance measure from the cluster center 402. Various distances measures than the one shown in FIG. 4A may be employed. A k-means method may be employed for the clustering.

The clusters of images are indicated as 412, 422, and 432. The images within a particular cluster are grouped into a corresponding subset of training images. Each cluster has a distribution of local density metrics and distance metrics of the training images that are included in the cluster, as well as a relationship between the different clusters. Thus, the density of a cluster may be defined via the local density distribution. The density of a cluster may serve as a measure of the complexity of the images included in a cluster. Thus, the clusters (and corresponding subsets) may be ranked in a sequence based on the complexity of the clusters.

Accordingly, a subset with a high local density metric indicates that the images within the subset are close to each other in the feature space, suggesting that these images have a strong similarity. Thus, subset 412 is defined as a clean subset with respect to the label of "cat." Insert 410 shows a portion of the images included in subset 412. The images within insert 410 appear to cleanly depict images of a house cat. Subsets with a smaller local density metric include images having a larger diversity in visual appearance, which may include more irrelevant images with incorrect labels. Thus subset 422 is considered as a "noisy" subset, as indicated in insert 420, displaying images included in subset 422. The images displayed in insert 420 do include a greater variance in the depictions of a cat. Because subset 432 has the smallest local density values, this is the noisiest subset. As shown in insert 430, many of these images appear to have been incorrectly included in the image category of "cat." As seen in FIG. 4A, images 410 from the clean subset 421 have very close visual appearance, while the noisiest subset 432 contains a number of random images 430 which are completely different from those images 410 in the clean subset 412.

Figure 4B:
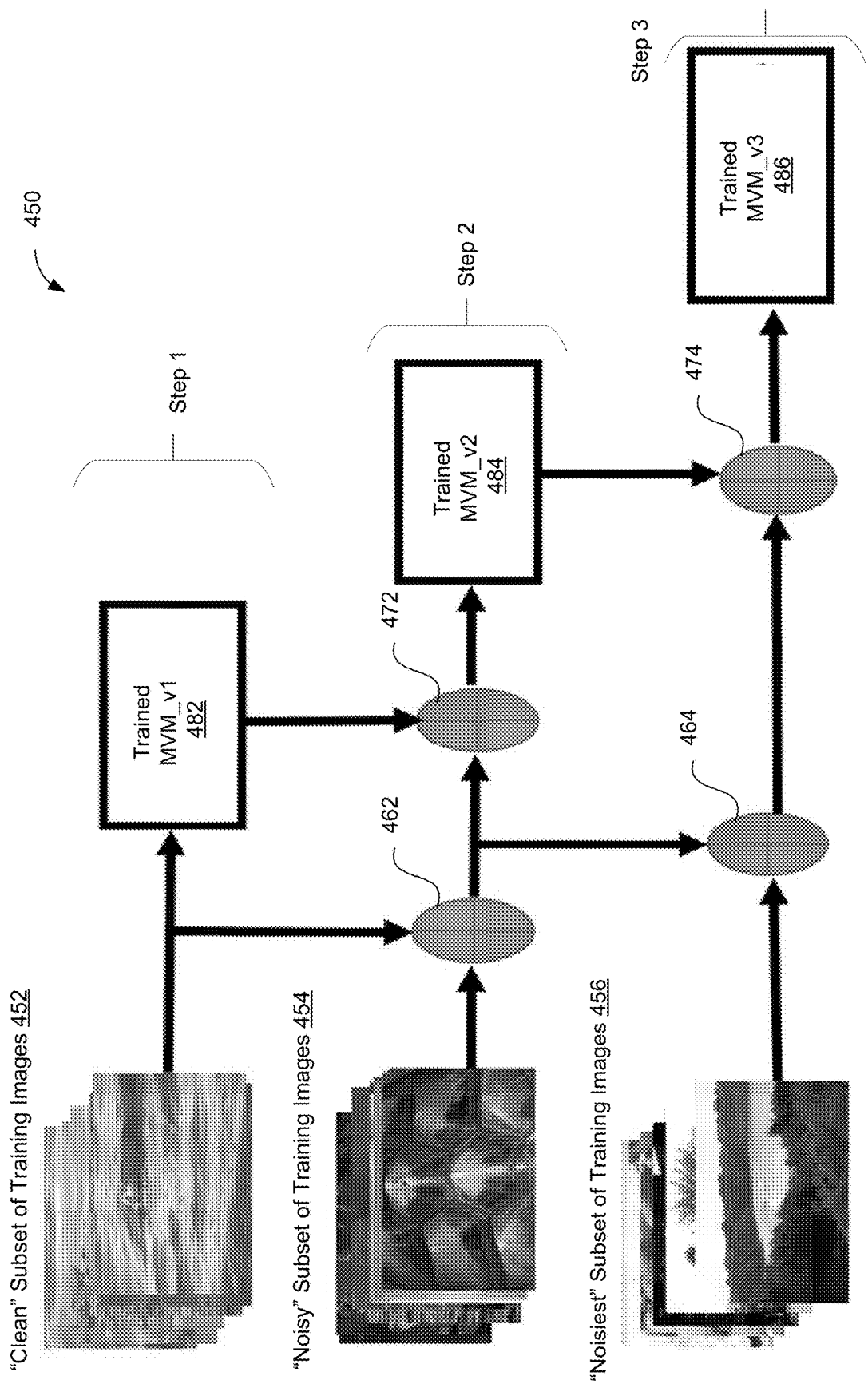
FIG. 4B schematically illustrates a process 450 that employs a progressive curriculum, designed in FIG. 4A, to train a machine vision method that is consistent with the embodiments herein.

FIG. 4B schematically illustrates a process 450 that employs a progressive curriculum, designed in FIG. 4A, to train a machine vision method that is consistent with the embodiments herein. That is, FIG. 4B illustrates additional details of process 330 of FIG. 3. Process 450 may receive a designed learning curriculum from process 320 of FIG. 3. That is, process 450 may receive a complexity-ranked sequence of subsets of training images. In the non-limiting embodiment of FIG. 4B, N=3, and process 450 receives a clean subset of training images 452, a noisy subset of training images 454, and a noisiest subset of training images 456.

In step 1 of process 450, the clean subset of training images in employed in training, via supervised (or weakly-supervised) methods, an MVM model. The MVM model may be a convolutional model implemented by a deep CNN. The training in step 1 continues until the MVM converges to a first stable version: trained MVM_v1 482. Because the training in step 1 uses images that have a close visual appearance (clean subset 452), MVM_v1 482 has accumulated basic and clear knowledge (i.e., fundamental features and distributions of features) of of all M categories in the whole training set (e.g., 1000 categories), that is leveraged in the training of step 2.

MVM_v1 482 is provided to step 2, as shown at operation 472. A combination of the clean subset of training images 452 and the noisy subset of training images 454 is generated at operation 462. In step 2, MVM_v1 482 is trained, via supervised learning methods, by employing the combination of the clean subset of training images 452 and the noisy subset of training images 454. The noisy subset 454 includes images with greater visual diversity, allowing the MVM to accumulate more meaningful knowledge that enables discrimination among the noisy images. Some of the noisy images may include incorrect labels, but the images may preserve at least portions of the underlying structure in the accumulated knowledge, leading to better performance of the MVM. The training in step 2 continues until the MVM_v1 482 converges to a second stable version: trained MVM_v2 484.

MVM_v2 484 is provided to step 3, as shown at operation 474. A combination of the clean subset of training images 452, the noisy subset of training images 454, and the noisiest subset of training images 456 is generated at operation 464. In step 3, MVM_v2 484 is trained, via supervised learning methods, by employing the combination of the clean subset of training images 452, the noisy subset of training images 454, and the noisiest subset of training images 456. Noisiest subset 456 may include a large number of visually irrelevant images with incorrect labels. The accumulated knowledge of deep features learned by step 1 and step 2 enable the capture of the main underlying structure of the image features. The employment of this highly noisy data continues to improve the performance of the MVM, and avoids the conventional issues associated with model overfitting when training only with clean images by providing a manner of regularization. The training in step 3 continues until the MVM_v2 484 converges to a third stable version: trained MVM_v3 486. MVM_v3 486 may be deployed to a production environment.

During the each of the steps, the loss weights for images from the separate sets may be varied. For example, in a non-limiting embodiment, in step 3, images from the clean subset 452 may be associated with a loss weight of 1.0, while images from the other two subsets 454-456 are associated with a loss weight of 0.5. In other embodiments (e.g., N>3), process 450 may continue, without loss of generality, to continue iteratively training the MVM, via additional subsets of still further noisier training images.

Generalized Processes for Complexity-Based Training of Machine Vision Models

Figure 9:
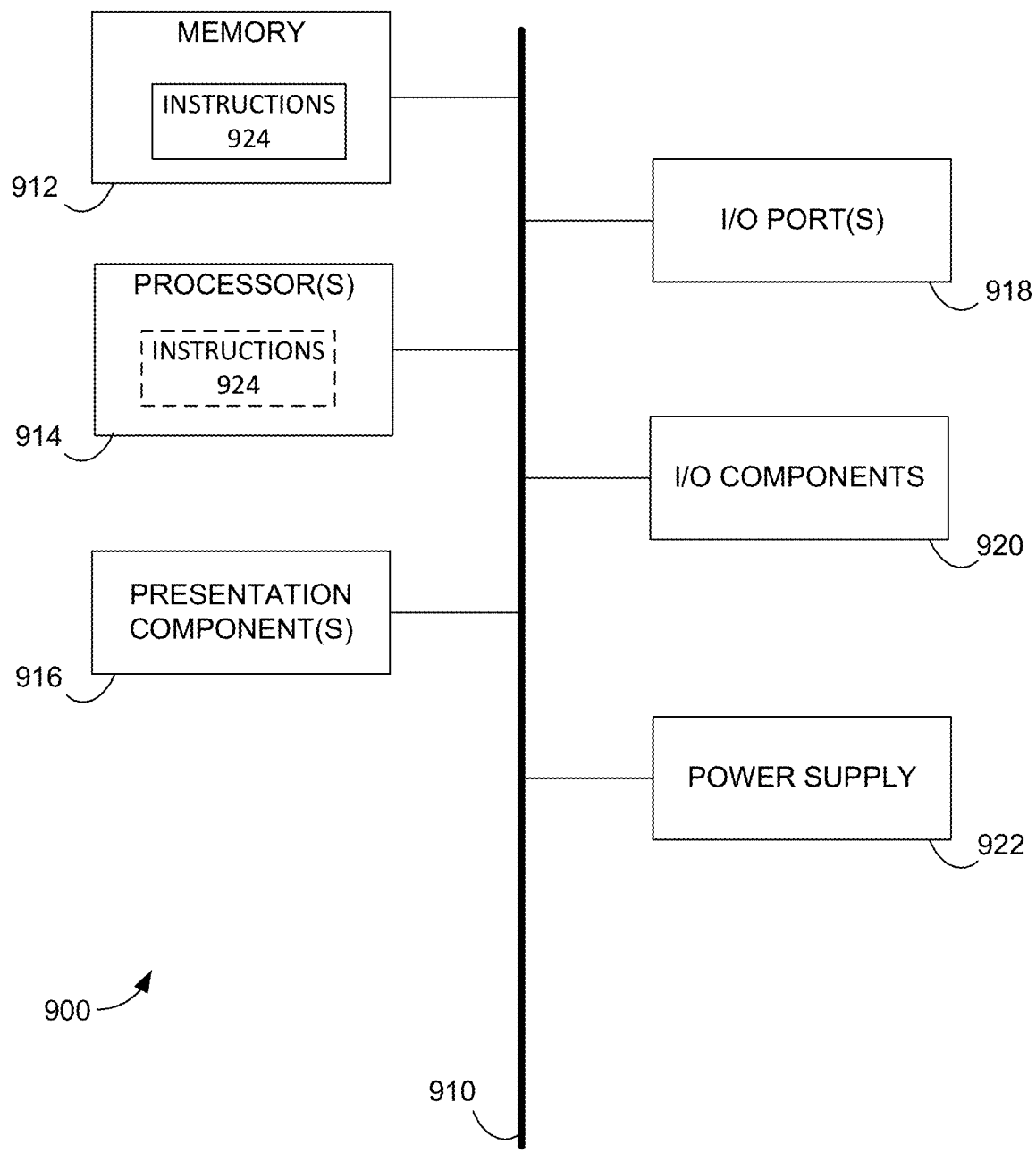
FIG. 9 is a block diagram of an example computing device in which embodiments of the present disclosure may be employed.

Processes 500-720 of FIGS. 5-7B, or portions thereof, may be performed and/or executed by any computing device, such as but not limited to computing devices 102-104 of FIG. 1, as well as computing device 900 of FIG. 9. Additionally, training engine, such as but not limited to enhanced training engine 120 of FIG. 1 may perform and/or execute at least portions of processes 500-720.

Figure 5:
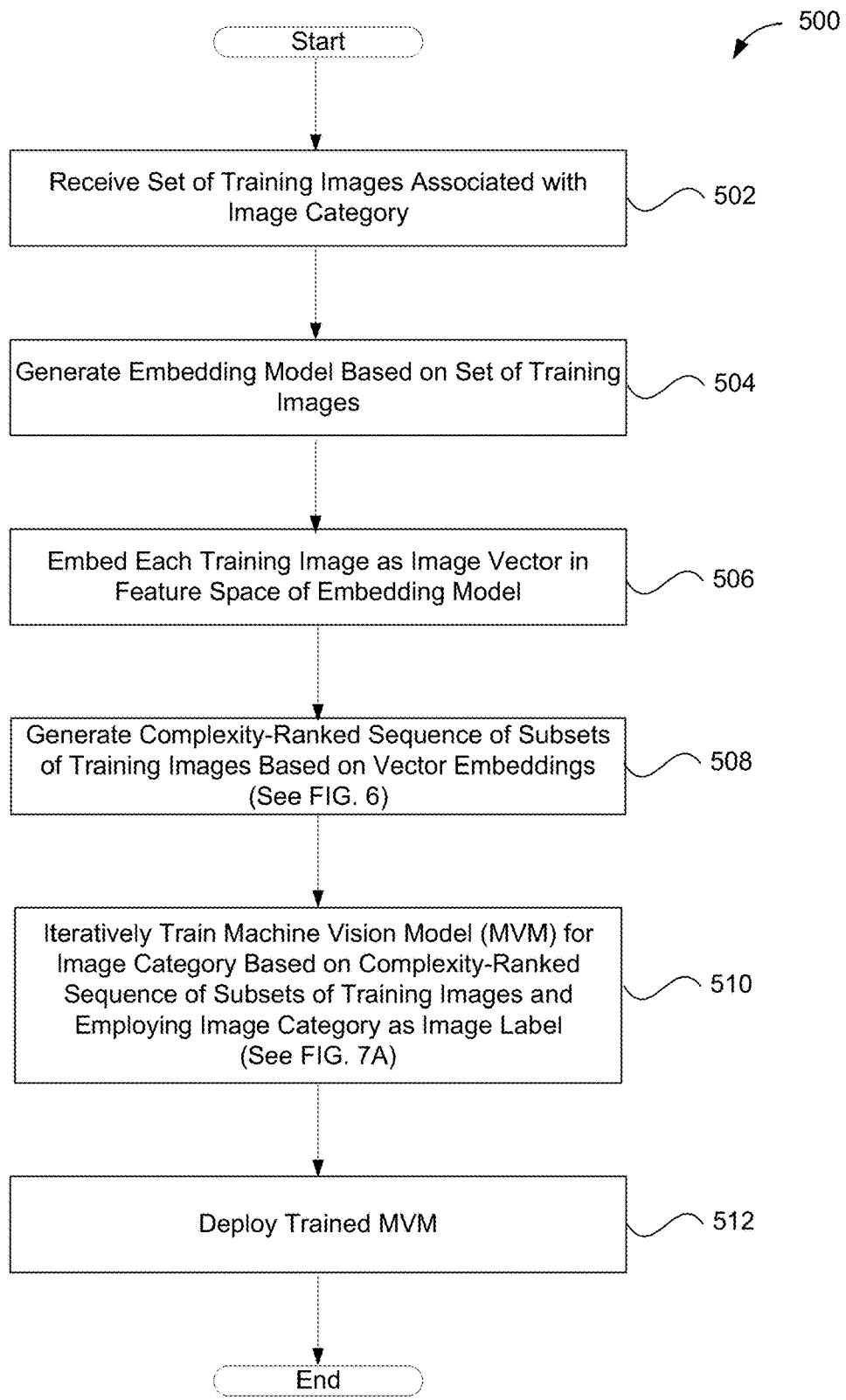
FIG. 5 illustrates one embodiment of an enhanced process flow for progressively training a machine vision model that is consistent with the various embodiments presented herein.

FIG. 5 illustrates one embodiment of an enhanced process flow for progressively training a machine vision model (MVM) that is consistent with the various embodiments presented herein. Process 500 begins, after a start block, at block 502, where a set of training images (i.e., a training dataset) is received. The training images are associated with M image categories (e.g., M=1000). Also at block 502, each of the images may be labeled based on the associated image category. At block 504, an embedding model is generated based on the set of training images. At block 506, each training image in the set of training images is embedded as an image vector in a feature space of the embedding model. That is, a vector representation is generated for each of the training images in a feature space.

At block 508, a complexity-ranked sequence of subsets of training images are generated based on the vector embeddings of block 506. Various embodiments of generating a complexity-ranked sequence of subsets of training images are discussed at least in conjunction with process 600 of FIG. 6. At block 510, the MVM is iteratively trained for M image categories. Various embodiments of iteratively training an MVM are discussed in conjunction with process 700 of FIG. 7A. However, briefly here, the iterative training may be based on the complexity-ranked sequence of subsets of training images, as well as employing the associated image category as a ground-truth label. In some embodiments, one or more supervised (or weakly-supervised) training methods are employed at block 510. At block 512, the trained MVM may be deployed. For example, the MVM may be deployed to a production environment.

Figure 6:
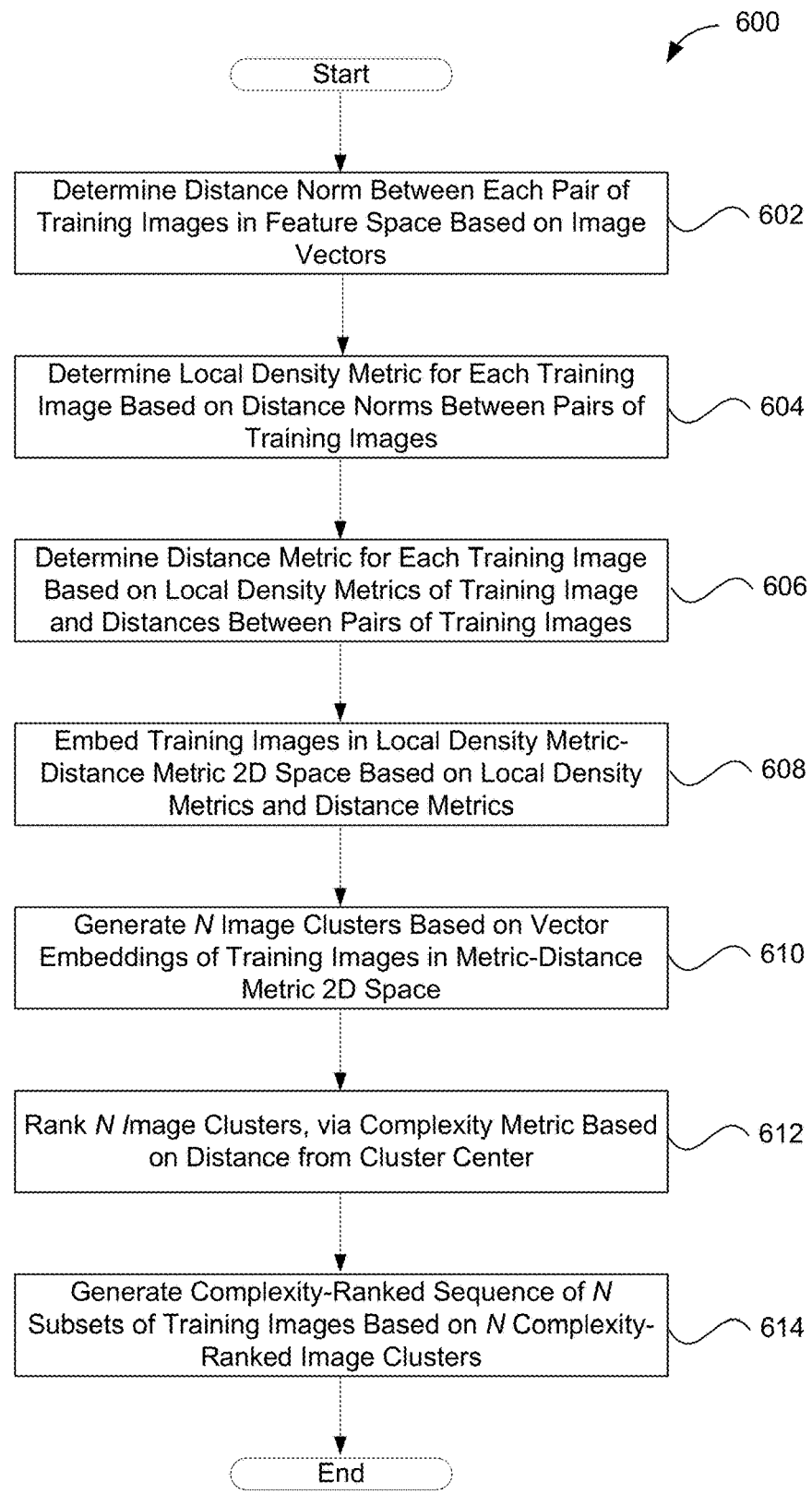
FIG. 6 illustrates one embodiment of an enhanced process flow for designing a progressive learning curriculum that is consistent with the various embodiments presented herein.

FIG. 6 illustrates one embodiment of an enhanced process flow for designing a progressive learning curriculum that is consistent with the various embodiments presented herein. Process 600 begins, after a start block, at block 602, where a distance norm between each pair of the training images within each category is determined. The distance metric may be based on the image vectors generated at block 506. At block 604, a local density metric is determined for each training image in the set of training images. The local density metric may be based on the distances between the pairs of training images. At block 606, a distance metric is determined for each training image in the set of training images. The distance metric may be based on the local density metrics of the training images and the distances between the pairs of training images.

At block 608, the training images are embedded in a 2D space formed by the local density metrics and the distance metrics, i.e., a local density metric-distance metric 2D space. At block 610, N image clusters are generated based on the vector embeddings of block 608. N is an integer greater than 1. At block 612, the N image clusters are ranked via a distance from a cluster center. At block 614, a complexity-ranked sequence of N subsets of training images is generated based on the N ranked image clusters.

Figure 7A:
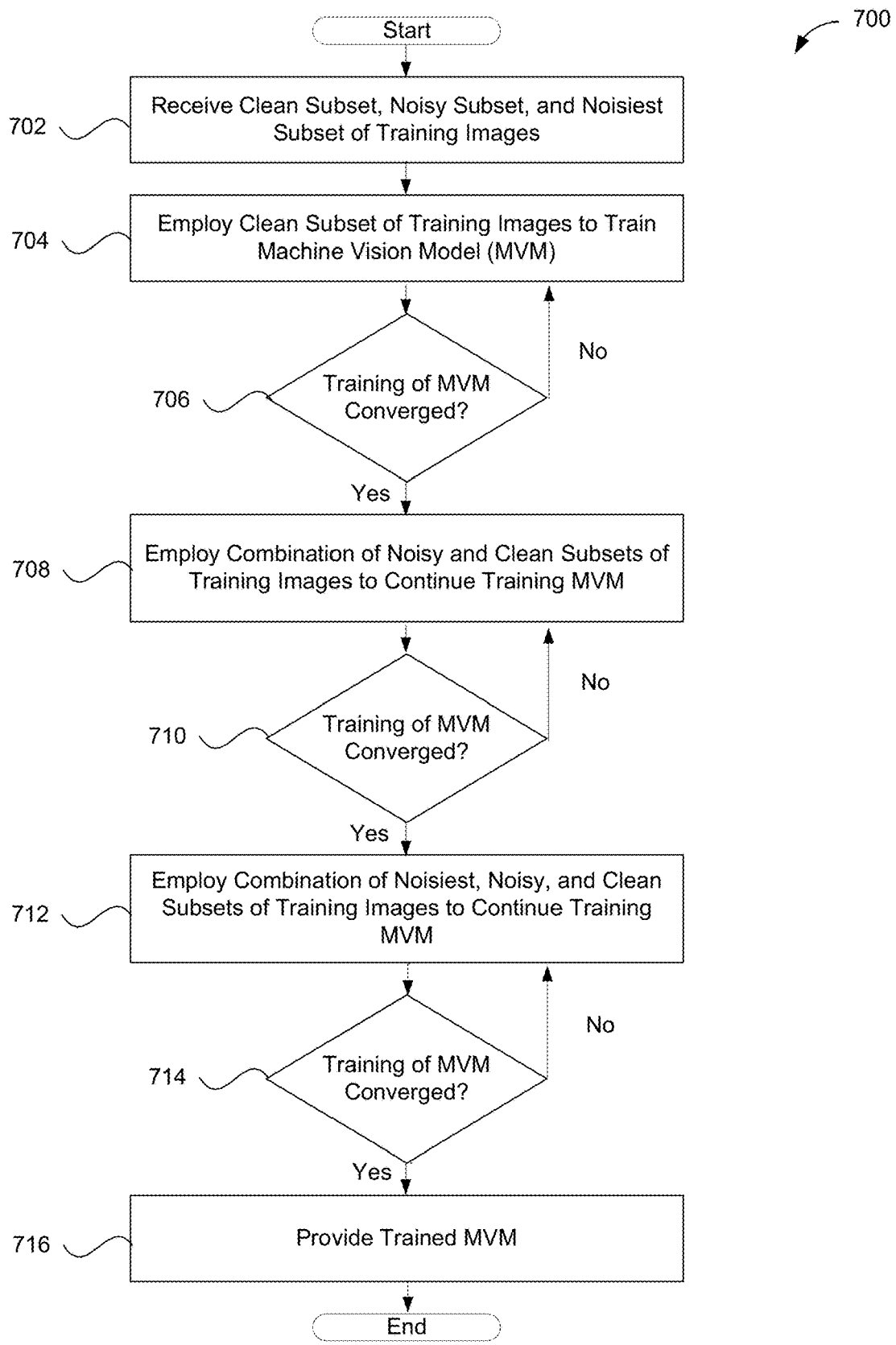
FIG. 7A illustrates one embodiment of an enhanced process flow for iteratively training a machine vision model employing the progressive learning curriculum designed via the process of FIG. 6 that is consistent with the various embodiments presented herein.

FIG. 7A illustrates one embodiment of an enhanced process flow for iteratively training a machine vision model (MVM) employing the progressive learning curriculum designed via process 600 of FIG. 6 that is consistent with the various embodiments presented herein. Process 700 shows the iterative training of the MVM via a learning curriculum of three subsets of training images. However, it should be understood that process 700 is generalizable for any learning curriculum that includes N subsets of training images, where N is any integer greater than 1. Process 700 begins, after a start block, at block 702, where three subsets of training images are received. In some embodiments, the subsets are ranked via complexity. The complexity-ranked sequence of subsets of training images may be provided via process 600. The subsets may include a clean subset, a noisy subset, and a noisiest subset.

At block 704, the MVM is iteratively trained via supervised (or weakly-supervised) methods and the clean subset of training images. At decision block 706, it is determined whether the iterative training of block 704 has converged to a stable model. If so, process 700 flows to block 708. If the training has not converged to a stable model, process 700 returns to block 704 to continue the iterative training of block 704.

At block 708, the MVM is iteratively trained via supervised methods and a combination of the clean subset of training images and the noisy subset of training images. At decision block 710, it is determined whether the iterative training of block 708 has converged to a stable model. If so, process 700 flows to block 712. If the training has not converged to a stable model, process 700 returns to block 708 to continue the iterative training of block 708.

At block 712, the MVM is iteratively trained via supervised methods and a combination of the clean subset of training images, the noisy subset of training images, and the noisiest subset of training images. At decision block 714, it is determined whether the iterative training of block 702 has converged to a stable model. If so, process 700 flows to block 716. If the training has not converged to a stable model, process 700 returns to block 712 to continue the iterative training of block 712. At block 716, the trained MVM is provided. For example, the trained MVM may be provided to a user or a production environment.

Figure 7B:
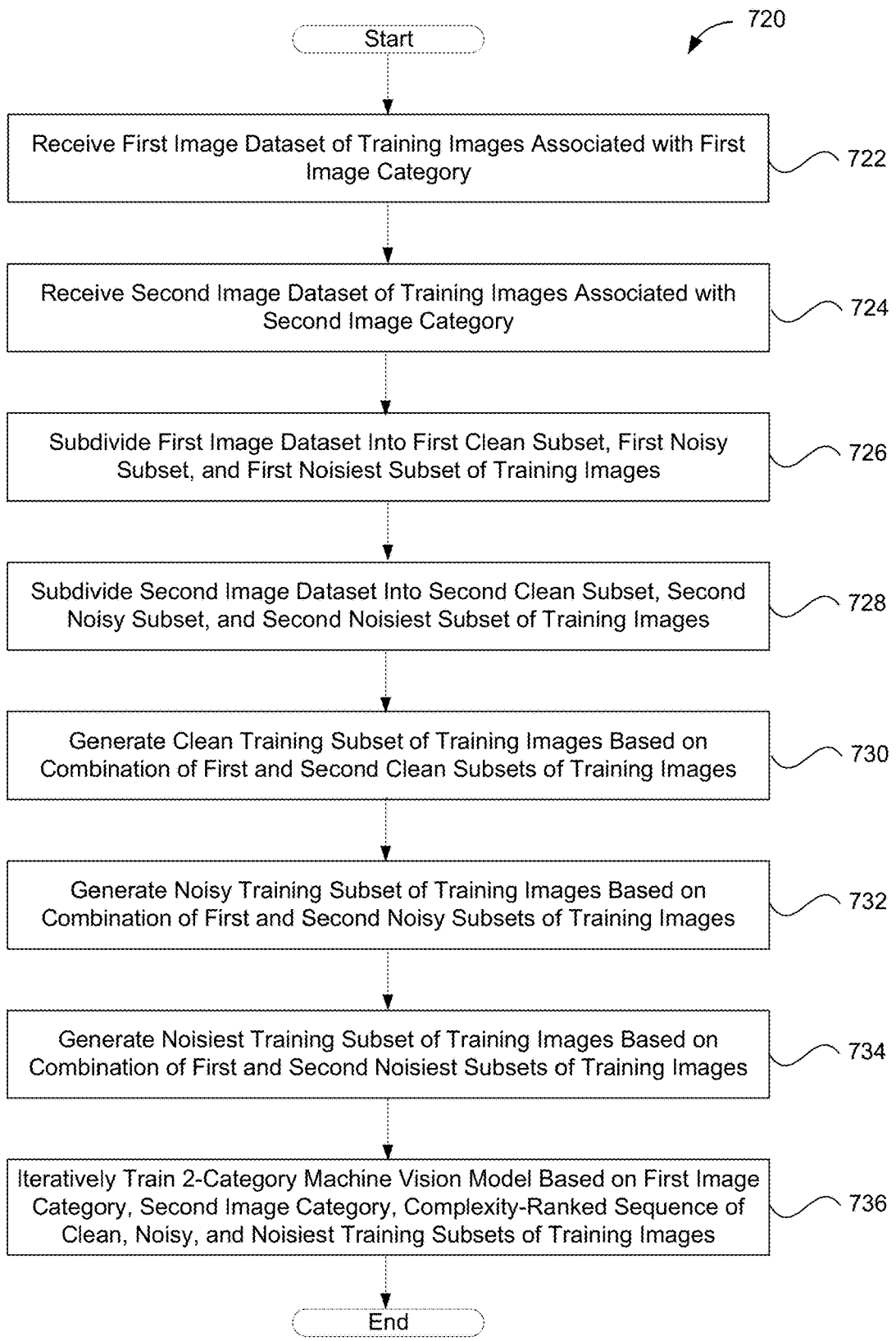
FIG. 7B illustrates one embodiment of an enhanced process flow for iteratively training a multiple-category machine vision model that is consistent with the various embodiments presented herein.

FIG. 7B illustrates one embodiment of an enhanced process flow for iteratively training a multiple-category machine vision model (MVM) that is consistent with the various embodiments presented herein. Process 720 shows the iterative training of the 2-category MVM (e.g., M=2) via a learning curriculum of three subsets (N=3) of training images. However, it should be understood that process 720 is generalizable for any learning curriculum that includes M categories and N subsets of training images, where M and N are integers greater than 1. For example, in at least some embodiments M=1000. That is, a 1000 category image classification model may be trained via generalizing process 720 from M=2 to M=1000 and a training image dataset that includes 1000 categories. For the non-limiting embodiment where M=2, process 720 begins, after a start block, at block 722, where a first image dataset is received. The first image dataset is associated with a first image category. The training images of the first image dataset may be labeled based on the first image category. At block 724, a second image dataset is received. The second image dataset is associated with a second image category. The training images of the second image dataset may be labeled based on the second image category.

At block 726, the first image dataset is subdivided into a first clean subset, a first noisy subset, and a first noisiest subset of training images. At block 728, the second image dataset is subdivided into a second clean subset, a second noisy subset, and a second noisiest subset of training images. At block 730, a clean training subset is generated based on a combination of the first and second clean subsets of training images. At block 730, a clean training subset is generated based on a combination of the first and second clean subsets of training images. At block 732, a noisy training subset is generated based on a combination of the first and second noisy subsets of training images. At block 734, a noisiest training subset is generated based on a combination of the first and second noisiest subsets of training images. At block 736, the 2-category MVM is iteratively trained. The iterative training is via supervised (or weakly-supervised) methods based on a learning curriculum that includes a complexity-ranked sequence of the clean, noisy, and noisiest training subsets of training images. The training is further based on the first and second image categories.

Performance of Complexity-Based Progressive Training of Machine Vision Models

Figure 8A:
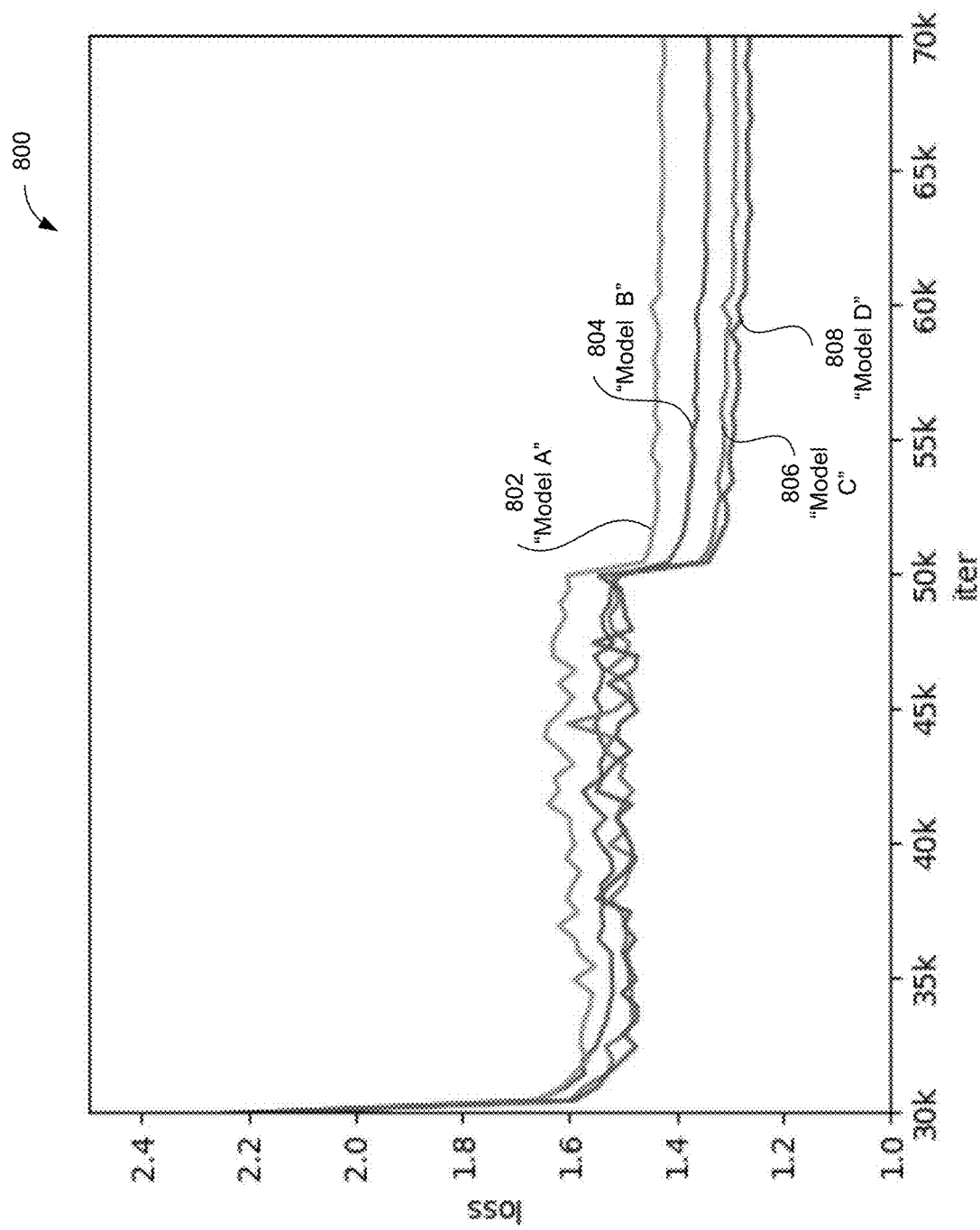
FIG. 8A illustrates a plot 800 of the training of four separate machine vision models, where some of the models are consistent with the embodiments discussed herein.

FIG. 8A illustrates a plot 800 of the training of four separate machine vision models, where some of the models are consistent with the embodiments discussed herein. The x-axis of plot 800 indicates the iteration number in the training of an MVM and the y-axis of plot 800 indicates a loss measure of the corresponding iteration. The training of a conventional model (Model A) that trains via a noisy subset that does not employ a progressive curriculum (i.e., randomly samples from the noisy subset) is shown in plot 802. Conventional Model B, which trains only with the least complex subset (i.e., the clean subset) is shown in plot 804. Note that Model B provides some increased performance (faster convergence and less loss), however Model B may be prone to overfitting issues. Model C, shown in plot 806, trains with a progressive curriculum, where N=2. That is, the progressive curriculum for Model C includes "clean" and "noisy" subsets of training images. Note the increased performance (faster convergence and less loss) of Model C, compared to model B. Further increases in performance are shown in Model D's plot 808, where N=3. The progressive curriculum for Model D includes "clean," "noisy," and "noisiest" subsets of training images. Thus, FIG. 8A shows the increased performance of the enhanced models (Model C and Model D) over the conventional models (Model A and Model B).

In another example of the increased machine vision performance enabled by the various embodiments, the four different models were trained in a multiple-category machine vision tasks. The top-1 and top-5 errors (%) were tabulated. Starting with Model A and termination with Model D, the top-1 errors (%) are as follows: 30.28, 30.16, 28.44, and 27.91. The top-5 errors (%) are as follows: 12.98, 12.43, 11.38, and 10.82. Accordingly, the enhanced models (Model C and Model D) outperform the conventional models (Model A and Model B).

Figure 8B:
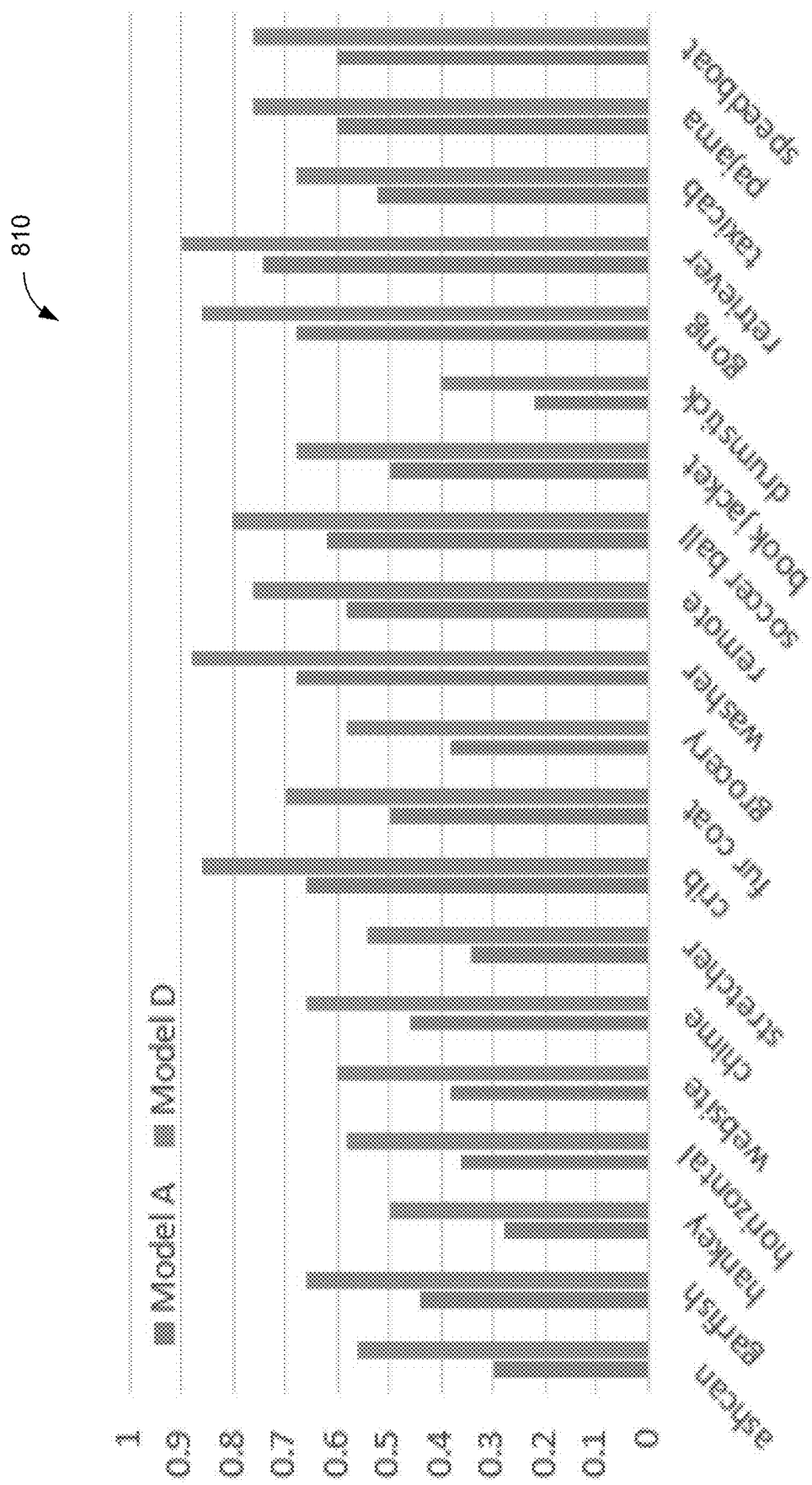
FIG. 8B illustrates a bar chart 810 of the performance of a conventional multiple-classification model and an enhanced multiple-classification model that is consistent with the embodiments discussed herein.

FIG. 8B illustrates a bar chart 810 of the performance of a conventional multiple-classification model and an enhanced multiple-classification model that is consistent with the embodiments discussed herein. Bar chart 810 shows the performance of a Model A (conventional) Model D (enhanced by training via a progressive curriculum). Each model was trained via 1000 different image categories, and the categories with Top 20 performance improvements are presented in 810, e.g., "ashcan," "garfish," "hankey," etc. The height of the y-axis indicates a performance measure. For comparing the performance of the conventional and the enhanced embodiments discussed herein, for each category, the performance of Model A is shown in the left and the performance of Model D is shown on the right. Visual inspection of bar chart 810 shows that, for each of the Top 20 image categories, Model D outperforms Model A. Thus, FIG. 8B demonstrates the increased performance of the enhanced Model D over the conventional Model A.

Illustrative Computing Device

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for training a machine vision model (MVM), which, when executed by a processor of a computing device cause the computing device to perform actions comprising:
    receiving a set of images, wherein each image included in the set of images is associated with a label based on a category corresponding to the set of images;
    apportioning the set of images into a plurality of image subsets, wherein a sequence of the plurality of images subsets is based on a complexity ranking associated with each image subset and a first complexity ranking for a first image subset of the plurality of image subsets indicates a degree of similarity of images included in the first image subset; and
    iteratively training the MVM based on an increasing complexity of the sequence of the plurality of image subsets and the label associated with the set of images.

2. The computer-readable storage medium of claim 1, the actions further comprising:
    for each image in the set of images, generating a vector representation in a feature space associated with the image category;
    determining one or more statistical distributions within the feature space, wherein the one or more statistical distributions are based on the vector representation for each image in the set of images;
    determining a plurality of images clusters based on the one or more statistical distributions; and
    generating the plurality of image subsets based on the plurality of image clusters.

3. The computer-readable storage medium of claim 1, wherein the MVM is an image classification model that is implemented by a convolutional neural network.

4. The computer-readable storage medium of claim 1, wherein the actions further comprise:
    determining a distance between each pair of images in the set of images, wherein the distance between a pair of images indicates the degree of similarity between the pair of images; and
    determining the first complexity ranking for the first image subset based on the determined distances between each pair of images included in the first image subset.

5. The one or more computer-readable storage media of claim 1, wherein the actions further comprise:
    training an embedding model to detect a plurality features in each of the images included in the set of images;
    employing the trained embedding model to embed each of the images included in the set of images within a feature space spanning the plurality of features; and
    generating the plurality of image subsets based on embedding the images in the feature space.

6. The one or more computer-readable storage media of claim 1, wherein the plurality of image subsets further includes a second image subset that is associated with a second complexity ranking that is greater than the first complexity ranking of the first image subset, and interactively training the MVM includes:
    employing a supervised trainer to train the MVM based on the first image subset; and
    in response to detecting a convergence in training the MVM based on the first image subset, employing the supervised trainer to continue training the MVM based on a combination of the first image subset and the second image subset.

7. The one or more computer-readable storage media of claim 1, wherein the plurality of image subsets further includes a second image subset that is associated with a second complexity ranking that is greater than the first complexity ranking of the first image subset, and the actions further comprising:
    apportioning a second set of images into a second plurality of image subsets that includes a third image subset that is associated with the first complexity ranking and a fourth image subset that is associated with the second complexity ranking, wherein each image in the second set of images is associated with a second label based on a second category corresponding to the second set of images;
    generating a fifth image subset that includes a combination of the first image subset and the third image subset;
    generating a sixth image subset that includes a combination of the second image subset and the fourth image subset;
    iteratively training the MVM based on the label associated with the set of images, the second label associated with the second set of images, and a sequence of image subsets that includes the fifth image subset and the sixth image subset.

8. A method for training a machine vision model (MVM), comprising:
    receiving a set of images, wherein each image included in the set of images is associated with a label based on a category corresponding to the set of images;
    apportioning the set of images into a plurality of image subsets, wherein a sequence of the plurality of images subsets is based on a complexity ranking associated with each image subset and a first complexity ranking for a first image subset of the plurality of image subsets indicates a degree of similarity of images included in the first image subset; and
    iteratively training the MVM based on the sequence of the plurality of image subsets and the label associated with the set of images.

9. The method for claim 8, further comprising:
for each image in the set of images, generating a vector representation in a feature space associated with the image category;
determining one or more statistical distributions within the feature space, wherein the one or more statistical distributions are based on the vector representation for each image in the set of images;
determining a plurality of images clusters based on the one or more statistical distributions; and
generating the plurality of image subsets based on the plurality of image clusters.

10. The method of claim 8, wherein the MVM is an object recognition model that is implemented by a convolutional neural network.

11. The method of claim 8, further comprising:
determining a distance between each pair of images in the set of images, wherein the distance between a pair of images indicates the degree of similarity between the pair of images; and
determining the first complexity ranking for the first image subset based on the determined distances between each pair of images included in the first image subset.

12. The method of claim 8, further comprising:
training an embedding model to detect a plurality features in each of the images included in the set of images;
employing the trained embedding model to embed each of the images included in the set of images within a feature space spanning the plurality of features; and
generating the plurality of image subsets based on embedding the images in the feature space.

13. The method of claim 8, wherein the plurality of image subsets further includes a second image subset that is associated with a second complexity ranking that is greater than the first complexity ranking of the first image subset, and interactively training the MVM includes:
employing a supervised trainer to train the MVM based on the first image subset; and
in response to detecting a convergence in training the MVM based on the first image subset, employing the supervised trainer to continue training the MVM based on a combination of the first image subset and the second image subset.

14. The method of claim 8, wherein the plurality of image subsets further includes a second image subset that is associated with a second complexity ranking that is greater than the first complexity ranking of the first image subset, and the method further comprising:
apportioning a second set of images into a second plurality of image subsets that includes a third image subset that is associated with the first complexity ranking and a fourth image subset that is associated with the second complexity ranking, wherein each image in the second set of images is associated with a second label based on a second category corresponding to the second set of images;
generating a fifth image subset that includes a combination of the first image subset and the third image subset;
generating a sixth image subset that includes a combination of the second image subset and the fourth image subset;
iteratively training the MVM based on the label associated with the set of images, the second label associated with the second set of images, and a sequence of image subsets that includes the fifth image subset and the sixth image subset.

15. A computing system, comprising:
a processor device; and
a computer-readable storage medium, coupled with the processor device, having instructions stored thereon, which, when executed by the processor device, train a machine vision model (MVM) by performing actions comprising:
receiving a set of images, wherein each image included in the set of images is associated with a label based on a category corresponding to the set of images;
apportioning the set of images into a plurality of image subsets, wherein a sequence of the plurality of images subsets is based on a complexity ranking associated with each image subset and a first complexity ranking for a first image subset of the plurality of image subsets indicates a degree of similarity of images included in the first image subset; and
iteratively training the MVM based on the sequence of the plurality of image subsets and the label associated with the set of images.

16. The computing system of claim 15, the actions further comprising:
for each image in the set of images, generating a vector representation in a feature space associated with the image category;
determining one or more statistical distributions within the feature space, wherein the one or more statistical distributions are based on the vector representation for each image in the set of images;
determining a plurality of images clusters based on the one or more statistical distributions; and
generating the plurality of image subsets based on the plurality of image clusters.

17. The computing system of claim 15, wherein the MVM is a semantic segmentation model that is implemented by a convolutional neural network.

18. The computing system of claim 15, the actions further comprising:
determining a distance between each pair of images in the set of images, wherein the distance between a pair of images indicates the degree of similarity between the pair of images; and
determining the first complexity ranking for the first image subset based on the determined distances between each pair of images included in the first image subset.

19. The computing system of claim 18, the actions further comprising:
training an embedding model to detect a plurality features in each of the images included in the set of images;
employing the trained embedding model to embed each of the images included in the set of images within a feature space spanning the plurality of features; and
generating the plurality of image subsets based on embedding the images in the feature space.

20. The computing system of claim 15, wherein the plurality of image subsets further includes a second image subset that is associated with a second complexity ranking that is greater than the first complexity ranking of the first image subset, and interactively training the MVM includes:
employing a supervised trainer to train the MVM based on the first image subset; and
in response to detecting a convergence in training the MVM based on the first image subset, employing the supervised trainer to continue training the MVM based on a combination of the first image subset and the second image subset.

\* \* \* \* \*